United States Patent
Williams et al.

(10) Patent No.: US 9,523,597 B2
(45) Date of Patent: Dec. 20, 2016

(54) FUEL DISPENSER FLOW METER FRAUD DETECTION AND PREVENTION

(71) Applicant: Gilbarco Inc., Greensboro, NC (US)

(72) Inventors: Rodger K. Williams, Siler City, NC (US); Edward A. Payne, Greensboro, NC (US); John A. Lofgren, Milwaukee, WI (US); Mark B. Monson, Madison, WI (US)

(73) Assignee: Gilbarco Inc., Greensboro, NC (US)

( * ) Notice: Subject to any disclaimer, the term of this patent is extended or adjusted under 35 U.S.C. 154(b) by 0 days.

(21) Appl. No.: 14/215,711

(22) Filed: Mar. 17, 2014

(65) Prior Publication Data

US 2014/0260514 A1    Sep. 18, 2014

Related U.S. Application Data

(60) Provisional application No. 61/793,032, filed on Mar. 15, 2013.

(51) Int. Cl.
*G01F 15/00* (2006.01)

(52) U.S. Cl.
CPC .................................. *G01F 15/007* (2013.01)

(58) Field of Classification Search
None
See application file for complete search history.

(56) References Cited

U.S. PATENT DOCUMENTS

| | | |
|---|---|---|
| 4,100,400 A | 7/1978 | Callahan et al. |
| 4,122,524 A | 10/1978 | McCrory et al. |
| 4,247,899 A | 1/1981 | Schiller et al. |
| 4,637,525 A | 1/1987 | Miura et al. |
| 4,728,788 A | 3/1988 | Myers et al. |
| 4,876,653 A | 10/1989 | McSpadden et al. |
| 5,016,187 A | 5/1991 | Forkert et al. |
| 5,111,682 A | 5/1992 | Halpin |
| 5,125,533 A | 6/1992 | Gayer et al. |

(Continued)

FOREIGN PATENT DOCUMENTS

WO    2012145681 A1    10/2012

OTHER PUBLICATIONS

International Preliminary Report on Patentability issued Sep. 15, 2015 for corresponding International Application No. PCT/US2014/030289.

(Continued)

*Primary Examiner* — Robert R Raevis
(74) *Attorney, Agent, or Firm* — Nelson Mullins Riley & Scarborough, LLP

(57) ABSTRACT

A fuel flow meter assembly for detecting fraud caused by tampering. The fuel flow meter assembly comprises a fuel flow meter comprising a shaft and a fiber optic displacement sensor operatively connected to the fuel flow meter shaft for generating information representative of an amount of fuel delivered through the fuel flow meter. The fuel flow meter assembly also comprises at least one transponder coupled with one of the fuel flow meter shaft and the displacement sensor. Further, the fuel flow meter assembly comprises at least one interrogator electronics coupled with the other of the fuel flow meter shaft and the displacement sensor. The at least one interrogator electronics is configured for remote electronic communication with the at least one transponder.

10 Claims, 19 Drawing Sheets

(56) References Cited

U.S. PATENT DOCUMENTS

| | | | |
|---|---|---|---|
| 5,208,742 A | 5/1993 | Warn | |
| 5,361,216 A | 11/1994 | Warn et al. | |
| 5,447,062 A | 9/1995 | Kopl et al. | |
| 5,506,570 A | 4/1996 | Scott et al. | |
| 5,557,084 A | 9/1996 | Myers et al. | |
| 5,596,501 A | 1/1997 | Comer et al. | |
| 5,602,745 A | 2/1997 | Atchley et al. | |
| 5,689,071 A | 11/1997 | Ruffner et al. | |
| 5,831,861 A | 11/1998 | Warn et al. | |
| 5,867,403 A * | 2/1999 | Sasnett, Jr. | B67D 7/08 137/2 |
| 5,923,572 A | 7/1999 | Pollock | |
| 5,954,080 A | 9/1999 | Leatherman | |
| 5,965,825 A | 10/1999 | Nitecki | |
| 6,067,476 A | 5/2000 | Siler | |
| 6,092,410 A | 7/2000 | Kaehler et al. | |
| 6,109,477 A | 8/2000 | Myers et al. | |
| 6,118,271 A | 9/2000 | Ely et al. | |
| 6,119,110 A | 9/2000 | Carapelli | |
| 6,250,151 B1 | 6/2001 | Tingleff et al. | |
| 6,302,129 B1 | 10/2001 | Van Dewerker | |
| 6,311,739 B1 | 11/2001 | Thompson et al. | |
| 6,313,737 B1 | 11/2001 | Freeze et al. | |
| 6,326,781 B1 | 12/2001 | Kunde et al. | |
| 6,360,138 B1 | 3/2002 | Coppola et al. | |
| 6,397,686 B1 | 6/2002 | Taivalkoski et al. | |
| 6,435,204 B2 | 8/2002 | White et al. | |
| 6,463,389 B1 | 10/2002 | Dickson | |
| 6,499,516 B2 | 12/2002 | Pope et al. | |
| 6,692,535 B2 | 2/2004 | Olivier | |
| 6,697,705 B2 | 2/2004 | Johnson et al. | |
| 6,721,669 B2 | 4/2004 | Kopl et al. | |
| 6,788,220 B2 | 9/2004 | Netzer | |
| 6,796,173 B1 | 9/2004 | Lajoie et al. | |
| 6,854,342 B2 | 2/2005 | Payne et al. | |
| 6,882,941 B2 | 4/2005 | Nanaji et al. | |
| 6,908,014 B1 | 6/2005 | Glover | |
| 6,935,191 B2 | 8/2005 | Olivier et al. | |
| 6,996,485 B2 | 2/2006 | Payne | |
| 7,028,561 B2 | 4/2006 | Robertson et al. | |
| 7,076,330 B1 | 7/2006 | Dickson | |
| 7,111,520 B2 | 9/2006 | Payne et al. | |
| 7,523,660 B2 | 4/2009 | Albrecht et al. | |
| 7,546,778 B2 | 6/2009 | Amante et al. | |
| 7,626,508 B2 | 12/2009 | Kosuge et al. | |
| 7,692,431 B2 | 4/2010 | Mackey | |
| 7,946,309 B2 | 5/2011 | Reid et al. | |
| 8,096,446 B2 | 1/2012 | Carapelli | |
| 8,240,515 B2 | 8/2012 | Kinzie et al. | |
| 8,285,506 B2 | 10/2012 | Oldham et al. | |
| 8,441,254 B2 | 5/2013 | Amante et al. | |
| 2003/0065422 A1 | 4/2003 | Johnson et al. | |
| 2004/0088122 A1 | 5/2004 | Nanaji et al. | |
| 2005/0147250 A1 | 7/2005 | Tang | |
| 2005/0262027 A1 | 11/2005 | Hutchinson et al. | |
| 2005/0287386 A1 | 12/2005 | Sabol et al. | |
| 2006/0265736 A1 | 11/2006 | Robertson et al. | |
| 2007/0129905 A1 | 6/2007 | Larsson et al. | |
| 2007/0151332 A1 | 7/2007 | Nagata et al. | |
| 2008/0103980 A1 | 5/2008 | Finley et al. | |
| 2008/0110981 A1 | 5/2008 | DeLine et al. | |
| 2008/0120191 A1 | 5/2008 | Long | |
| 2008/0250869 A1 | 10/2008 | Breed et al. | |
| 2008/0290152 A1 | 11/2008 | Lundgren et al. | |
| 2009/0058641 A1 | 3/2009 | DeMarco | |
| 2009/0267618 A1 | 10/2009 | Zhao | |
| 2009/0314804 A1 | 12/2009 | Kinzie et al. | |
| 2009/0315729 A1 | 12/2009 | Inhoffer | |
| 2010/0154530 A1 | 6/2010 | Oddie | |
| 2010/0262385 A1 | 10/2010 | Chen et al. | |
| 2010/0295672 A1 | 11/2010 | Hyland et al. | |
| 2011/0031267 A1 * | 2/2011 | Liebal | B67D 7/08 222/1 |
| 2011/0148399 A1 | 6/2011 | Amante et al. | |
| 2011/0191037 A1 * | 8/2011 | Oldham | G01F 25/00 702/45 |
| 2011/0233392 A1 | 9/2011 | Amante | |
| 2012/0150344 A1 | 6/2012 | Jennings | |
| 2013/0110286 A1 | 5/2013 | Williams | |

OTHER PUBLICATIONS

International Search Report and Written Opinion mailed Aug. 12, 2014 in corresponding International Application PCT/US2014/030289, all enclosed pages cited.

Extended European Search Report issued on Nov. 2, 2016 in corresponding European patent application No. 147645832, all enclosed pages cited.

* cited by examiner

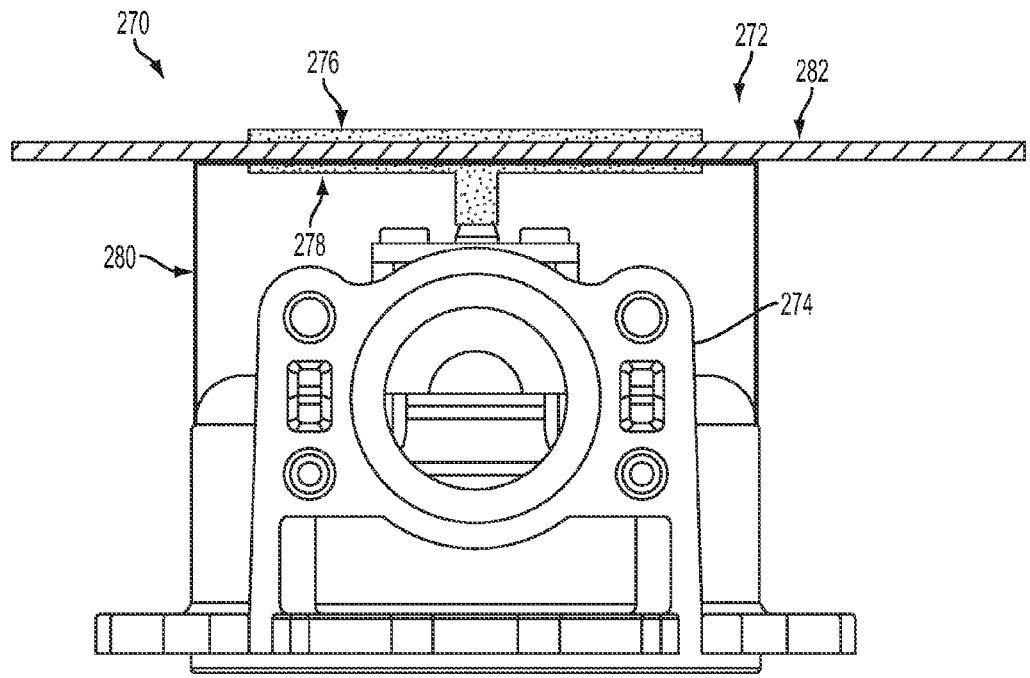
FIG. 13
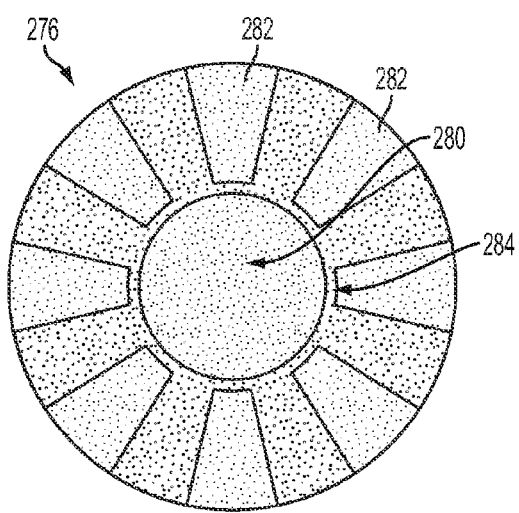 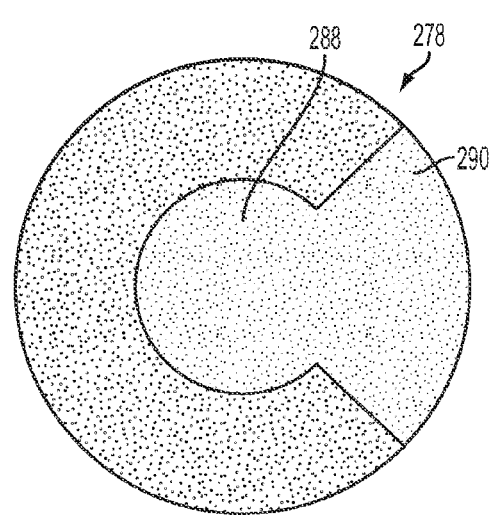
FIG. 14A  FIG. 14B

FUEL DISPENSER FLOW METER FRAUD DETECTION AND PREVENTION

PRIORITY CLAIM

This application claims the benefit of U.S. Provisional Application Ser. No. 61/793,032, filed Mar. 15, 2013, which is hereby relied upon and incorporated herein by reference for all purposes.

FIELD OF THE INVENTION

The present invention relates generally to fuel dispensers. More specifically, the present invention relates to detection and prevention of fraud caused by tampering with a fuel flow meter associated with a fuel dispenser.

BACKGROUND

Fuel dispensers in retail service station environments include flow meters that measure the volumetric flow rate of fuel as it is dispensed. Such flow meters are typically required to comply with weights and measures regulatory requirements that mandate a high level of accuracy. This ensures that the customer is neither overcharged nor undercharged for the fuel purchase. Typically, either positive displacement meters or inferential meters have been used for this purpose.

In modern service station fuel dispensers, a control system processes signals generated by a displacement sensor to monitor the amount of fuel delivered to a customer's vehicle. Various types of displacement sensors have been used to sense the flow rate of various fluids, including magnetic sensors and optical sensors. One such displacement sensor is referred to as a pulser. Pulsers are sensors operatively connected to the flow meter to measure rotation of a flow meter shaft. As fuel is dispensed, causing the shaft to rotate, the pulser generates a pulse train. Each pulse represents a known volume of fuel (e.g., 0.001 gallons) passing through the meter.

Attempts have been made to interfere with the displacement sensor on a fuel flow meter in order to modify the calculated volume of fuel dispensed. For example, a dishonest consumer may disconnect the displacement sensor (or one of its components) from the fuel flow meter prior to a fueling transaction. Also, a dishonest consumer may disable either or both of the fuel dispenser or displacement sensor electronics and force fuel through the fuel flow meter.

Often, mechanical means are used to prevent detachment of the displacement sensor from the fuel flow meter. For example, commonly-owned U.S. Pub. App. No. 2009/0314804 to Kinzie et al., incorporated by reference herein in its entirety for all purposes, discloses a lockable enclosure for protecting a pulser of a fuel dispenser. Alternatively, locks and pins on the meter and pulser have been used for this purpose.

SUMMARY

The present invention recognizes and addresses disadvantages of prior art constructions and methods. According to one embodiment, the present invention provides a fuel flow meter assembly for detecting fraud caused by tampering. The fuel flow meter assembly comprises a fuel flow meter comprising a shaft and a fiber optic displacement sensor operatively connected to the fuel flow meter shaft for generating information representative of an amount of fuel delivered through the fuel flow meter. The fuel flow meter assembly also comprises at least one transponder coupled with one of the fuel flow meter shaft and the displacement sensor. Further, the fuel flow meter assembly comprises at least one interrogator electronics coupled with the other of the fuel flow meter shaft and the displacement sensor. The at least one interrogator electronics is configured for remote electronic communication with the at least one transponder.

According to a further embodiment, the present invention provides a fuel flow meter assembly comprising a fuel flow meter comprising a shaft and a first displacement sensor for generating information representative of a first amount of fuel delivered through the fuel flow meter. The first displacement sensor comprises at least one transponder operatively coupled for rotation with the fuel flow meter shaft and at least one interrogator electronics configured for remote electronic communication with the at least one transponder. The fuel flow meter assembly also comprises a second displacement sensor for generating information representative of a second amount of fuel delivered through the fuel flow meter. The second displacement sensor comprises a disc operatively connected for rotation with the fuel flow meter shaft. The disc defines a plurality of radial slots therethrough. The second displacement sensor is in optical communication with a light source and a detector. Rotation of the fuel flow meter shaft allows light from the light source to pass through the plurality of radial slots and be detected at the detector.

In another embodiment, the present invention provides a method of detecting fraud in association with a flow meter assembly, the flow meter assembly comprising a flow meter comprising a shaft. The method comprises the step of providing a first displacement sensor for generating information representative of a first amount of fluid delivered through the flow meter. The first displacement sensor comprises at least one transponder and at least one interrogator electronics configured for remote electronic communication with the at least one transponder. The method also comprises the step of providing a second displacement sensor for generating information representative of a second amount of fluid delivered through the flow meter. The second displacement sensor comprises a disc operatively connected for rotation with the flow meter shaft. The disc defines a plurality of radial slots therethrough. The second displacement sensor is in optical communication with a light source and a detector. Further, the method comprises the steps of determining the first amount based on information representative of responsive signals from the transponder to the interrogator electronics and determining the second amount based on light detected at the detector. Finally, the method comprises comparing the first amount with the second amount.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 13 is a side view of an exemplary fuel flow meter assembly comprising a capacitive displacement sensor constructed in accordance with an embodiment of the present invention.

FIG. 14A is a bottom view of a reader disc which may be used with the capacitive displacement sensor shown in FIG. 12 according to an embodiment of the present invention.

FIG. 14B is a top view of an encoder disc which may be used with the capacitive displacement sensor shown in FIG. 12 according to an embodiment of the present invention.

Figure 1:
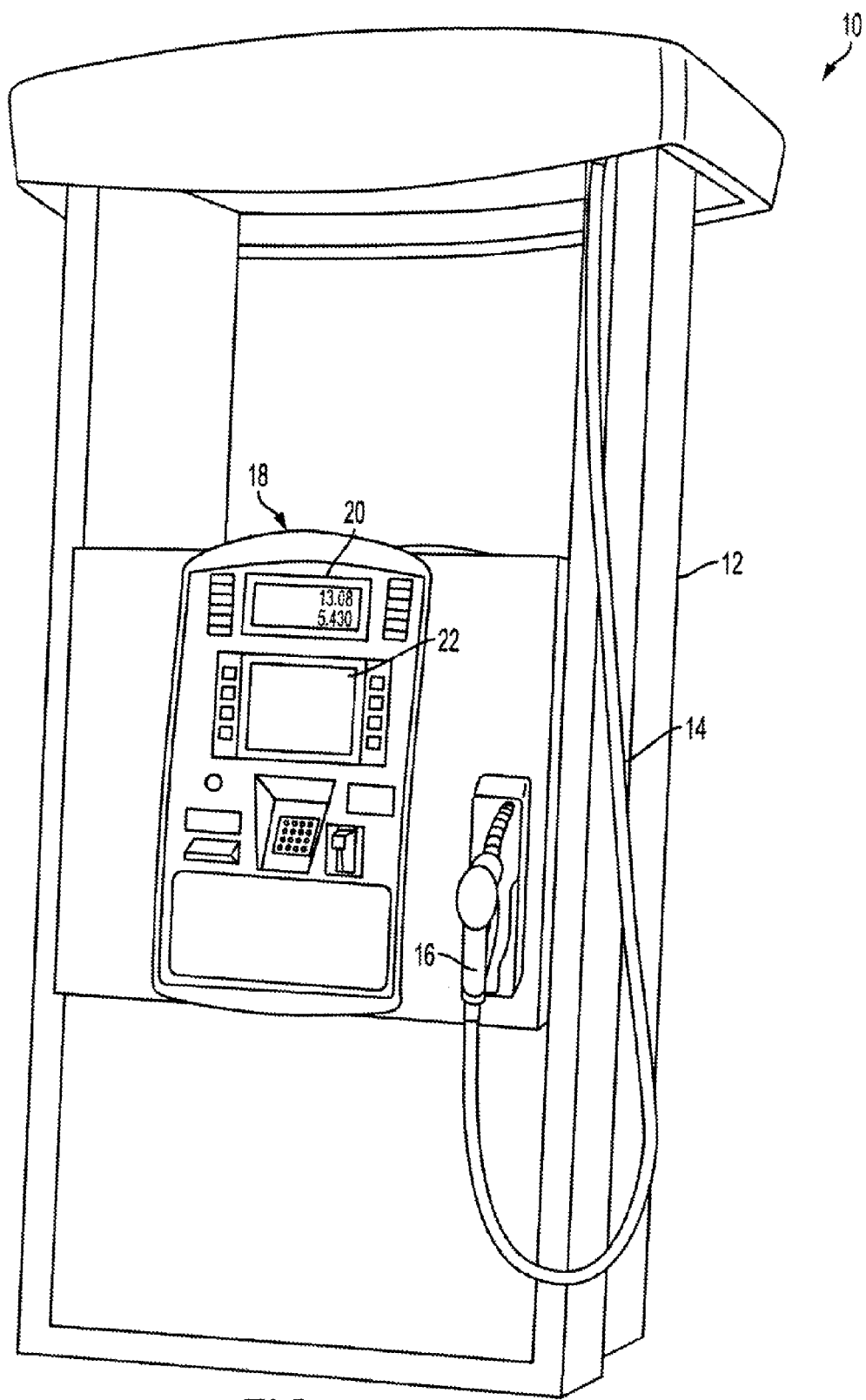
FIG. 1 is perspective view of an exemplary fuel dispenser in which embodiments of the present invention may be used.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Reference is hereby made to commonly-assigned U.S. Pat. No. 8,285,506 (the '506 patent), entitled "Fuel Dispenser Pulser Arrangement," filed Feb. 2, 2010, and U.S. Published Application No. 2013/0110286, entitled "Fuel Dispenser Flow Meter Fraud Detection and Prevention," filed Apr. 20, 2012, the entire disclosures of both of which are incorporated by reference herein for all purposes.

Aspects of the present invention relate to detection and prevention of fraud caused by tampering with a displacement sensor coupled to a fuel dispenser fuel flow meter. Generally, embodiments employ wireless communications between at least one transponder and interrogator electronics associated with a fuel flow meter and a displacement sensor. For example, certain radio-frequency identification (RFID) techniques may be advantageously used in accordance with the present invention. RFID systems typically comprise a tag, a transceiver, and a processor or controller. The transceiver, or interrogator, has at least one antenna, a microprocessor, and other electronic circuitry. The tag, or transponder, often has transponder electronic circuitry and an antenna. The electronic circuitry may include a nonlinear device or semiconductor junction (such as a diode) configured to generate a harmonic of the interrogating frequency to indicate the transponder's presence. In some more complex transponders, the electronic circuitry includes an integrated circuit or other processing device for storing and processing information transmitted from and modulating a return signal to the interrogator. The electronic circuitry of the transponder may also include a capacitor and nonvolatile memory.

Passive transponders use a signal from the interrogator to provide energy which activates the transponder's circuitry, while active transponders contain an independent energy source such as a battery. Battery-assisted passive transponders are also known. In one familiar mode of operation, the interrogator sends an interrogation signal to the transponder at a first frequency, the transponder responds by transmitting a coded signal on a second frequency, and the interrogator receives and processes the coded signal. The interrogator sends the information contained in the coded signal to the controller for processing.

Preferably, embodiments of the present invention may utilize interrogator electronics associated with the displacement sensor, which is operatively coupled to the fuel flow meter, and the at least one transponder may be coupled with or embedded in components of the fuel flow meter (such as a shaft thereof). The interrogator electronics are preferably in electronic communication with a fuel dispenser control system or another suitable control system. However, as discussed below, other configurations of the at least one transponder and interrogator electronics are contemplated. For example, the interrogator electronics may be coupled with the fuel flow meter and the at least one transponder may be coupled with a displacement sensor or pulser.

Aspects of the present invention also provide a number of methods for detecting and preventing fraud. As discussed below, for example, the fuel flow meter and displacement sensor may be wirelessly "paired" via the transponder and interrogator electronics. Thus, a fuel dispenser control system may disallow fueling until an expected signal has been transmitted from the transponder to the displacement sensor. Where the control system does not receive such a signal at the start of a transaction, this may indicate that the displacement sensor has been removed from the flow meter.

In accordance with a further aspect of the present invention, at least one transponder rotating with the fuel flow meter shaft may be read by the interrogator electronics during each rotation of the shaft. The fuel dispenser control system may correlate each "read" of the transponder with an expected output from the displacement sensor (e.g., 100 pulses per transponder signal) to ensure the displacement sensor has not been tampered with. In some embodiments, for example, the interrogator electronics may receive signals from a transponder a plurality of times during a single rotation. In this case, as the orientation of the tag changes with rotation of the meter shaft, changes in the gain of the interrogator electronics and transponder and/or phase of the transmitted signals may be indicative of rotation of the meter shaft. The control system may also use this information regarding rotation to validate operation of the displacement sensor. In a final example, interrogator electronics may be used to store information representative of the fuel flow meter's history and performance on a transponder coupled with the flow meter.

For the sake of conciseness and readability, the term "transponder" will be used herein to describe any type of remote communications device capable of communicating with communications electronics. The remote communications device may include receivers and transmitters alone or in combination as well as transponder electronics adapted to respond to and/or modify an original signal to provide a transmit signal. The preferred communications method includes radio frequencies typically used in RFID applications, but other RF, infrared, acoustic or other known remote communication methods may also be used in some embodiments. A transponder as defined herein may provide either unidirectional or bidirectional communications with fixed-location communications electronics and may be active or passive. Likewise, the fixed location communications electronics may also be referred to as "interrogator electronics." Interrogator electronics will generally include a transmitter and a receiver capable of communicating with a transponder.

FIG. 1 is a perspective view of an exemplary fuel dispenser 10 in which embodiments of the present invention may be used. For example, fuel dispenser 10 may be the ENCORE® fuel dispenser sold by Gilbarco Inc. of Greensboro, N.C. Those of skill in the art will appreciate, however, that the present invention may be used with flow meters in any fuel dispenser.

Fuel dispenser 10 includes a housing 12 with at least one flexible fuel hose 14 extending therefrom. Fuel hose 14 terminates in a manually-operated nozzle 16 adapted to be inserted into a fill neck of a vehicle's fuel tank. Nozzle 16 includes a fuel valve. Various fuel handling components, such as valves and meters, are also located inside of housing 12. These fuel handling components allow fuel to be received from underground piping and delivered through hose 14 and nozzle 16 to a vehicle's tank, as is well understood.

The fuel dispenser 10 has a customer interface 18. Customer interface 18 may include an information display 20 that shows the amount of fuel dispensed and the price of the dispensed fuel. Further, customer interface 18 may include a media display 22 to provide advertising, merchandising, and multimedia presentations to a customer in addition to basic transaction functions. The graphical user interface provided by the dispenser may allow customers to purchase goods and services other than fuel at the dispenser. The dispenser also preferably includes a credit card reader and a PIN pad to allow the customer to pay for the fuel at the dispenser using credit or debit cards.

Figure 2:
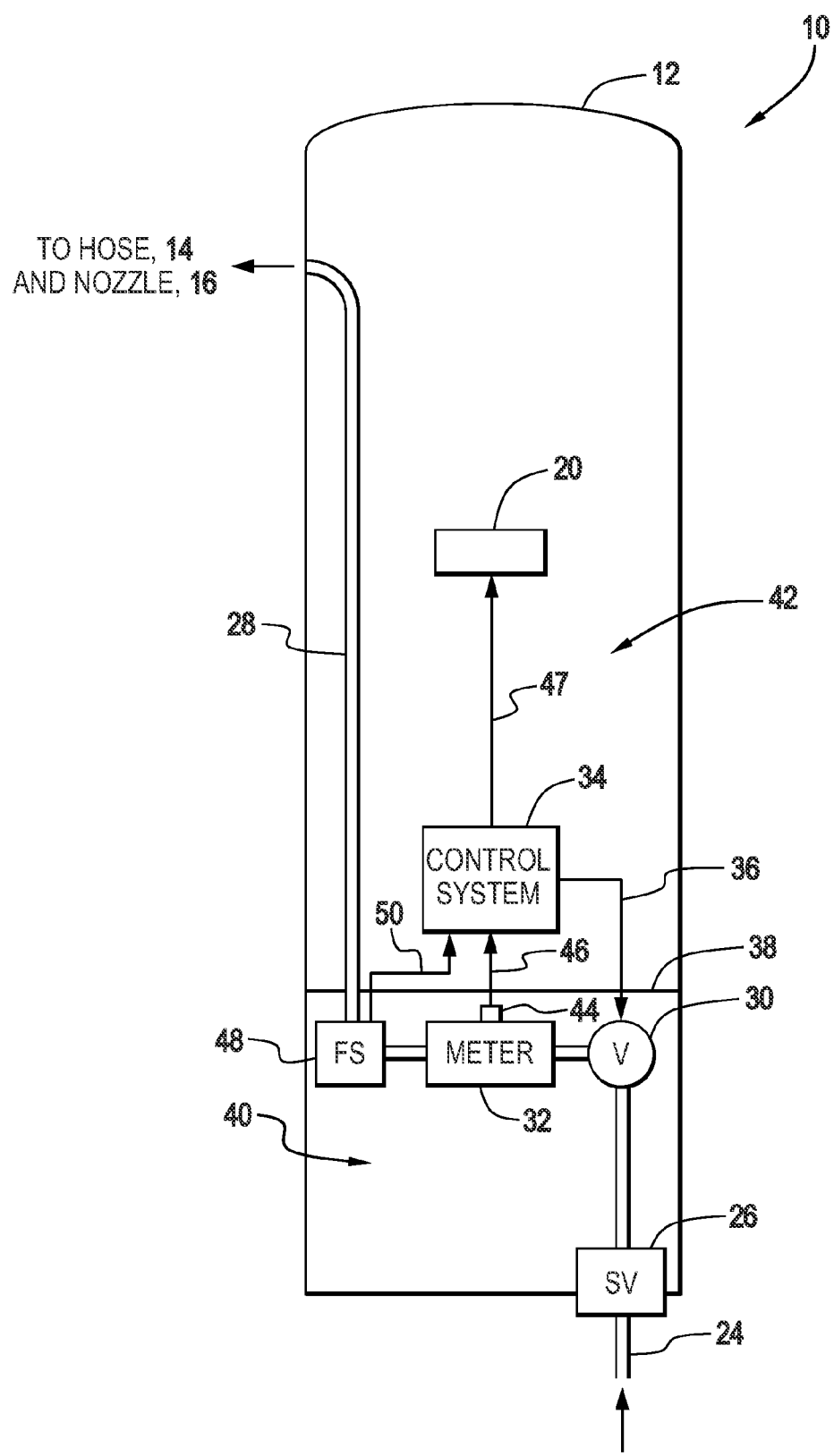
FIG. 2 is a schematic diagram of internal fuel flow components of the fuel dispenser of FIG. 1.

FIG. 2 is a schematic illustration of internal components of fuel dispenser 10. In general, fuel may travel from an underground storage tank (UST) via main fuel piping 24, which may be a double-walled pipe having secondary containment as is well known, to fuel dispenser 10 and nozzle 16 for delivery. An exemplary underground fuel delivery system is illustrated in U.S. Pat. No. 6,435,204 to White et al., hereby incorporated by reference in its entirety for all purposes. In many cases, a submersible turbine pump (STP) associated with the UST is used to pump fuel to the fuel dispenser 10. However, some fuel dispensers may be equipped with a pump and motor within housing 12 to draw fuel from the UST to the fuel dispenser 10.

Main fuel piping 24 may pass into housing 12 first through shear valve 26. As is well known, shear valve 26 is designed to close the fuel flow path in the event of an impact to fuel dispenser 10. U.S. Pat. No. 7,946,309 to Reid et al., hereby incorporated by reference in its entirety for all purposes, discloses an exemplary secondarily-contained shear valve adapted for use in service station environments. Shear valve 26 contains an internal fuel flow path to carry fuel from main fuel piping 24 to internal fuel piping 28, which may also be double-walled.

After fuel exits the outlet of the shear valve 26 and enters into the internal fuel piping 28, it may encounter a flow control valve 30 positioned upstream of a flow meter 32. In some fuel dispensers, the valve 30 may be positioned downstream of the flow meter 32. The valve 30 may preferably be a proportional solenoid controlled valve, such as described in U.S. Pat. No. 5,954,080 to Leatherman, hereby incorporated by reference in its entirety for all purposes.

Flow control valve 30 is under control of a control system 34 via a flow control valve signal line 36. Control system 34 may be a microprocessor, microcontroller, or other electronics with associated memory and software programs running thereon. In this manner, the control system 34 can control the opening and closing of the flow control valve 30 to either allow fuel to flow or not flow through meter 32 and on to hose 14 and nozzle 16.

Flow control valve 30 is typically contained below a vapor barrier 38 delimiting a hydraulics compartment 40 of the fuel dispenser 10. The control system 34 is typically located in an electronics compartment 42 of fuel dispenser 10 above vapor barrier 38. In this embodiment, after fuel exits flow control valve 30, it flows through meter 32, which measures the volume and/or flow rate of the fuel.

Flow meter 32 may be a positive displacement or inferential flow meter having one or more rotors which rotate on one or more shafts. Some examples of positive displacement flow meter technology which may be modified for use with the present invention are provided in U.S. Pat. No. 6,250,151 to Tingleff et al., U.S. Pat. No. 6,397,686 to Taivalkoski et al., and U.S. Pat. No. 5,447,062 to Köopl et al., each of which is hereby incorporated by reference in its entirety for all purposes. Likewise, examples of inferential flow meter technology with may be modified for use with the present invention are provided in U.S. Pat. No. 7,111,520 to Payne et al. and U.S. Pat. No. 5,689,071 to Ruffner et al. and U.S. Pat. No. 8,096,446 to Carapelli, each of which is also incorporated by reference herein in its entirety for all purposes.

Meter 32 is operatively connected to a displacement sensor 44 that generates a signal indicative of the volumetric flow rate of fuel and periodically transmits the signal to control system 34 via a signal line 46. In this manner, the control system 34 can update the total gallons dispensed and the price of the fuel dispensed on information display 20 via a communications line 47.

The term "displacement sensor" comprises any suitable device which converts shaft angular position to an analog or digital signal that can be detected and further processed. The term includes, but is not limited to, any type of noncontact rotary position sensor or encoder. Embodiments of the present invention may be variously used with both positive displacement and inferential fuel flow meters. Further information on suitable displacement sensor technologies is provided in commonly-owned U.S. Pub. App. No. 2012/0150344, hereby incorporated by reference in its entirety for all purposes.

In one embodiment, displacement sensor 44 may be a pulser. Those of ordinary skill in the art are familiar with pulsers that may be modified for use with the present invention. For example, displacement sensor 44 may be the T18350-G6 pulser offered by Gilbarco Inc. In other embodiments, however, displacement sensor 44 may be another suitable displacement sensor as described above.

As fuel leaves flow meter 32 it enters a flow switch 48. Flow switch 48, which preferably includes a one-way check valve that prevents rearward flow through fuel dispenser 10, provides a flow switch communication signal to control system 34 via the flow switch signal line 50. The flow switch communication signal indicates to control system 34 that fuel is actually flowing in the fuel delivery path and that subsequent signals from flow meter 32 are due to actual fuel flow.

After the fuel leaves flow switch 48, it exits through internal fuel piping 28 to be delivered through fuel hose 14 and nozzle 16 for delivery to the customer's vehicle.

Figure 3A:
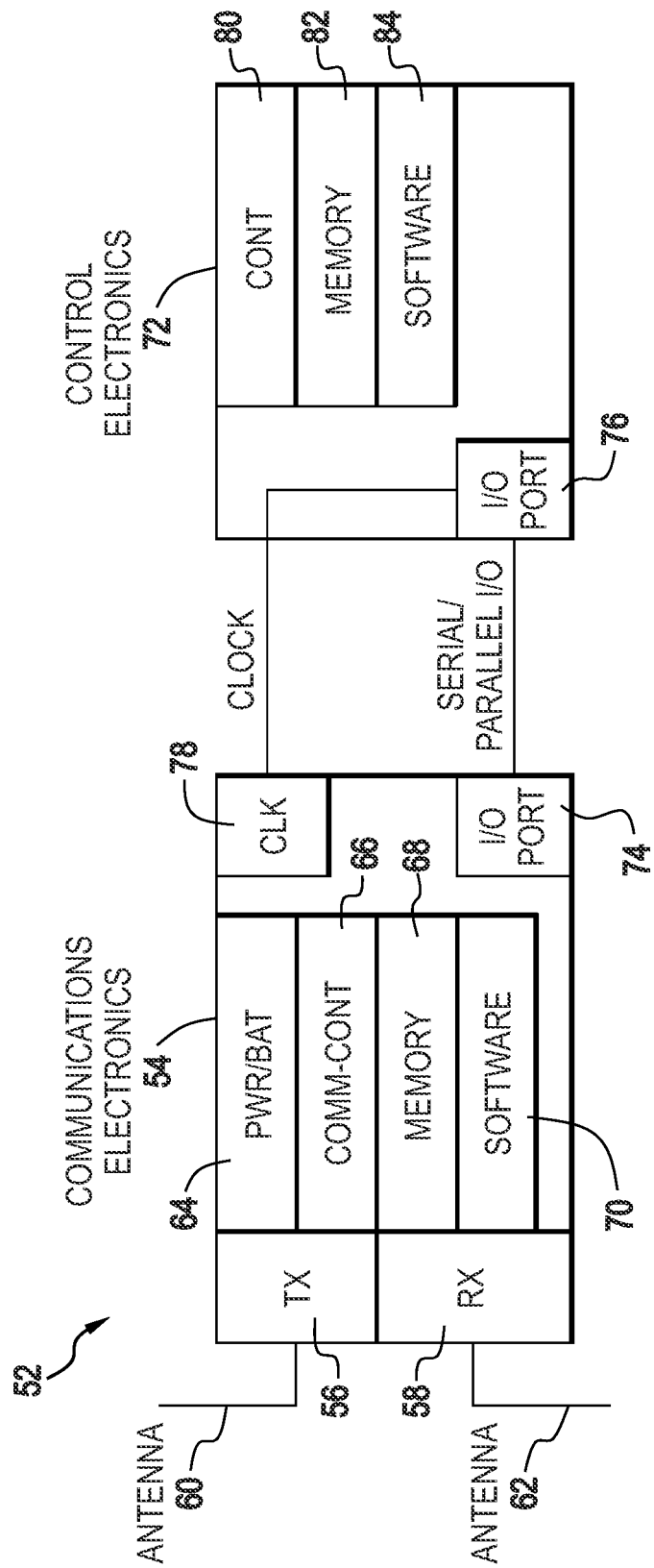
FIG. 3A is a diagrammatic representation of a transponder constructed in accordance with an embodiment of the present invention.

FIG. 3A illustrates one embodiment of a transponder 52 which may be configured for use with the present invention. Communications electronics 54, adapted to provide remote communications with various remote sources, includes a transmitter 56 and receiver 58 having associated antennas 60 and 62. Transmitter 56 and receiver 58 operate to transmit data from and receive data into the transponder 52. The antennas 60 and 62 may be any suitable type of antenna, including but not limited to a pole or slot antenna. Additionally, transponder 52 may operate with only one antenna. Communications electronics 54 may also include power circuitry 64 and a communication controller 66 associated with a memory 68 having any software (e.g., firmware) 70 necessary or desirable to operate the communications electronics 54 and communicate with the control electronics 72. Because transponder 52 may be active, passive, or battery-assisted passive, power circuitry 64 may be a battery or an alternative energy storage unit that is charged by electromagnetic energy when the device is in the field of the interrogator signal.

Communications electronics 54 is capable of receiving remote communications signals through at least one of the antennas 60 and 62, and demodulating these signals. Serial communication between communications electronics 54 and control electronics 72 is provided via the input/output (I/O) ports 74 and 76 associated with the respective electronics. Communications electronics 54 provides a clock 78 to signal the I/O port 76 of the control electronics 72. Control electronics 72 may include a general controller 80, memory 82, and software 84 to provide remote processing. Memories 68 and 82 may include random access memory (RAM), read only memory (ROM), or a combination of both, as necessary or appropriate. Further, the memory may preferably be nonvolatile memory that stores information to be communicated to interrogator electronics.

Notably, communication controller 66 and general controller 80 may be integrated into one controller. Similarly, the software and memory of the communication and general control modules may be merged. Finally, control electronics 72 and the communications electronics 54 may be combined and may also include encryption hardware or software as necessary or desired. Indeed, communications between a transponder 52 and interrogator electronics may preferably be encrypted in a manner similar to near-field communications (NFC) payment security today. Further detail regarding the components of certain transponder devices is disclosed in commonly owned U.S. Pat. No. 6,313,737 to Freeze et al., the entire disclosure of which is incorporated herein by reference for all purposes.

Figure 3B:
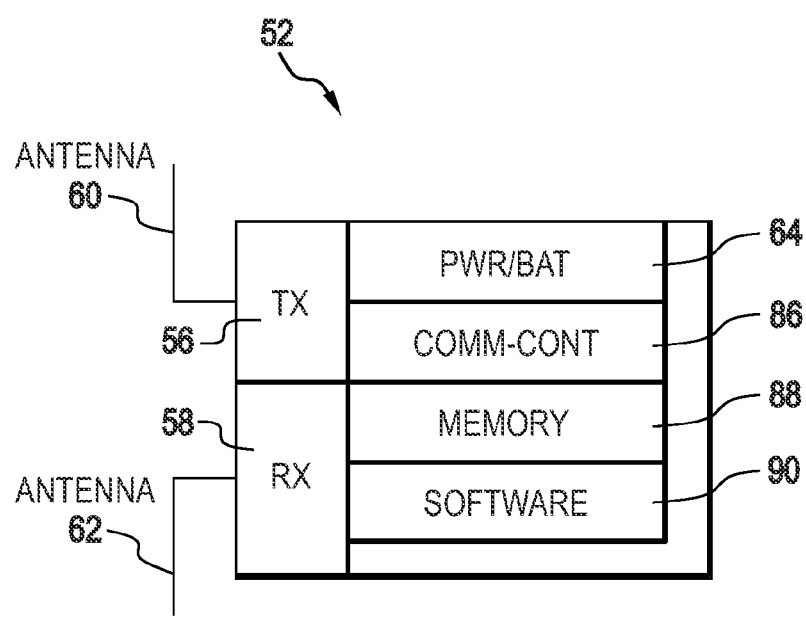
FIG. 3B is a diagrammatic representation of a transponder having integrated electronics constructed in accordance with an embodiment of the present invention.

As shown in FIG. 3B, the communications and general control electronics, as well as any associated controllers may be integrated into a single controller system and/or integrated circuit. In such cases, a single controller 86 is associated with memory 88 having any software 90 necessary or desirable for operation. In such an integrated system, controller 86 will carry out any control functions.

Figure 4:
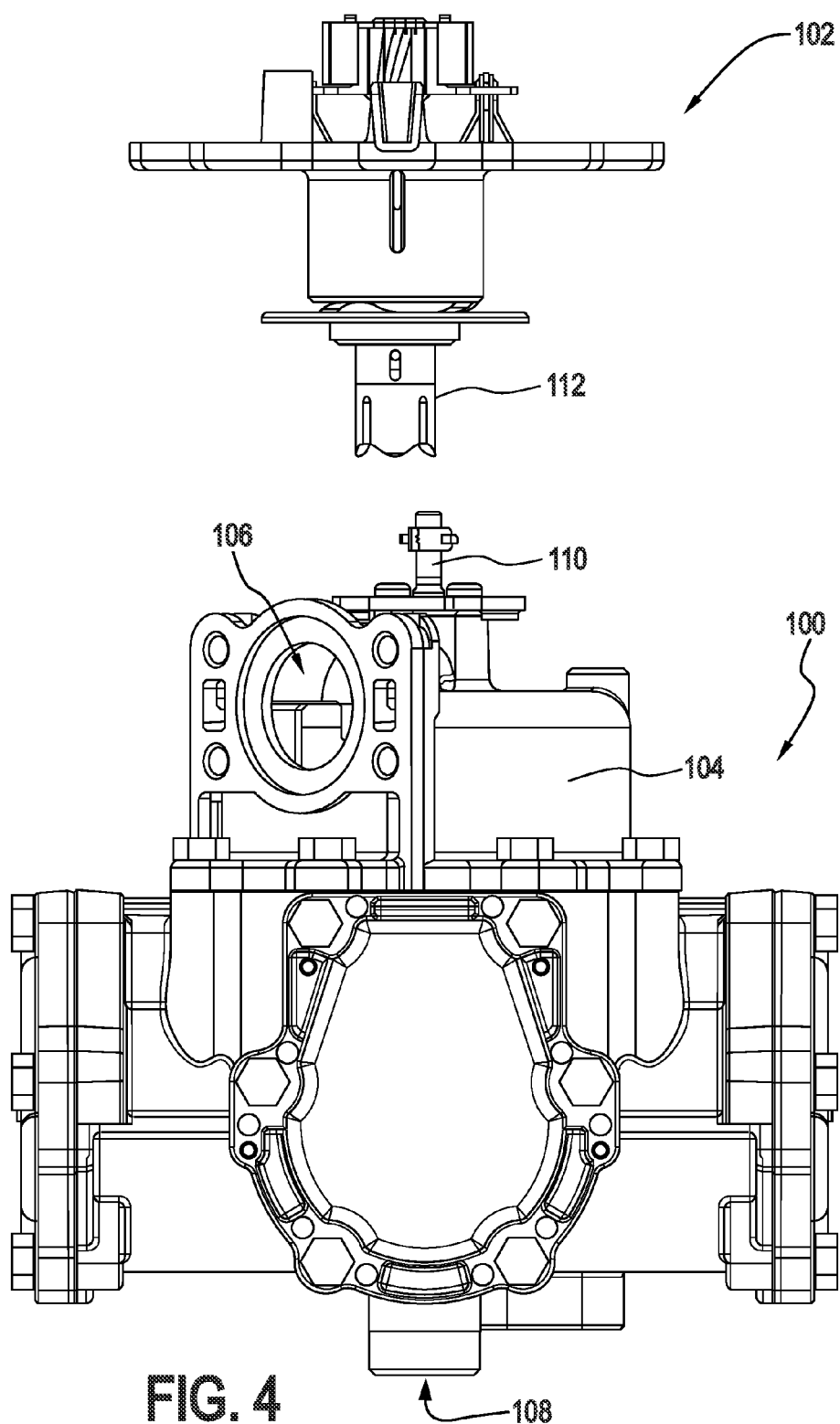
FIG. 4 is an elevational view of an exemplary positive displacement meter and a pulser which may be configured for use with the present invention, the meter and pulser being separated for purposes of illustration.

FIG. 4 shows a positive displacement meter 100 and a pulser 102 (separated for illustrative purposes) which may be configured for use with the present invention. In the illustrated embodiment, meter 100 may be similar to the C+ meter offered by Gilbarco Inc. As shown, meter 100 comprises a body 104 defining a fuel inlet 106 and a fuel outlet 108. As described above, fuel piping internal to a fuel dispenser is coupled to inlet 106 and outlet 108. Additionally, meter 100 comprises a shaft 110 extending from body 104. It will be appreciated that shaft 110 rotates in response to fuel flow through meter 100.

Pulser 102 comprises a sleeve 112 which surrounds a shaft 113 (FIG. 6) configured for operative connection to shaft 110. Those of skill in the art will appreciate that in some embodiments pulser 102 may be disposed above a vapor barrier. In such a case, the pulser shaft typically extends through the vapor barrier for operative connection with shaft 110. Likewise, it will be appreciated that pulser 102 also comprises internal pulser electronics in electronic communication with a fuel dispenser control system (such as control system 34 described above). In addition to generating a pulse series indicative of fuel volume flowing through meter 100, the pulser electronics may electronically adjust the pulse series to account for measurement errors. As is well known, the pulse series is transmitted to the fuel dispenser control system for totalization and/or additional processing. Additional information regarding communications between pulser electronics and a fuel dispenser control system is provided in the '506 patent. Generally, however, the pulser electronics may comprise nonvolatile memory in electronic communication with a processor, such as a microcontroller, microprocessor or the like. The processor preferably includes software necessary to operate interrogator electronics as described below.

Figure 5:
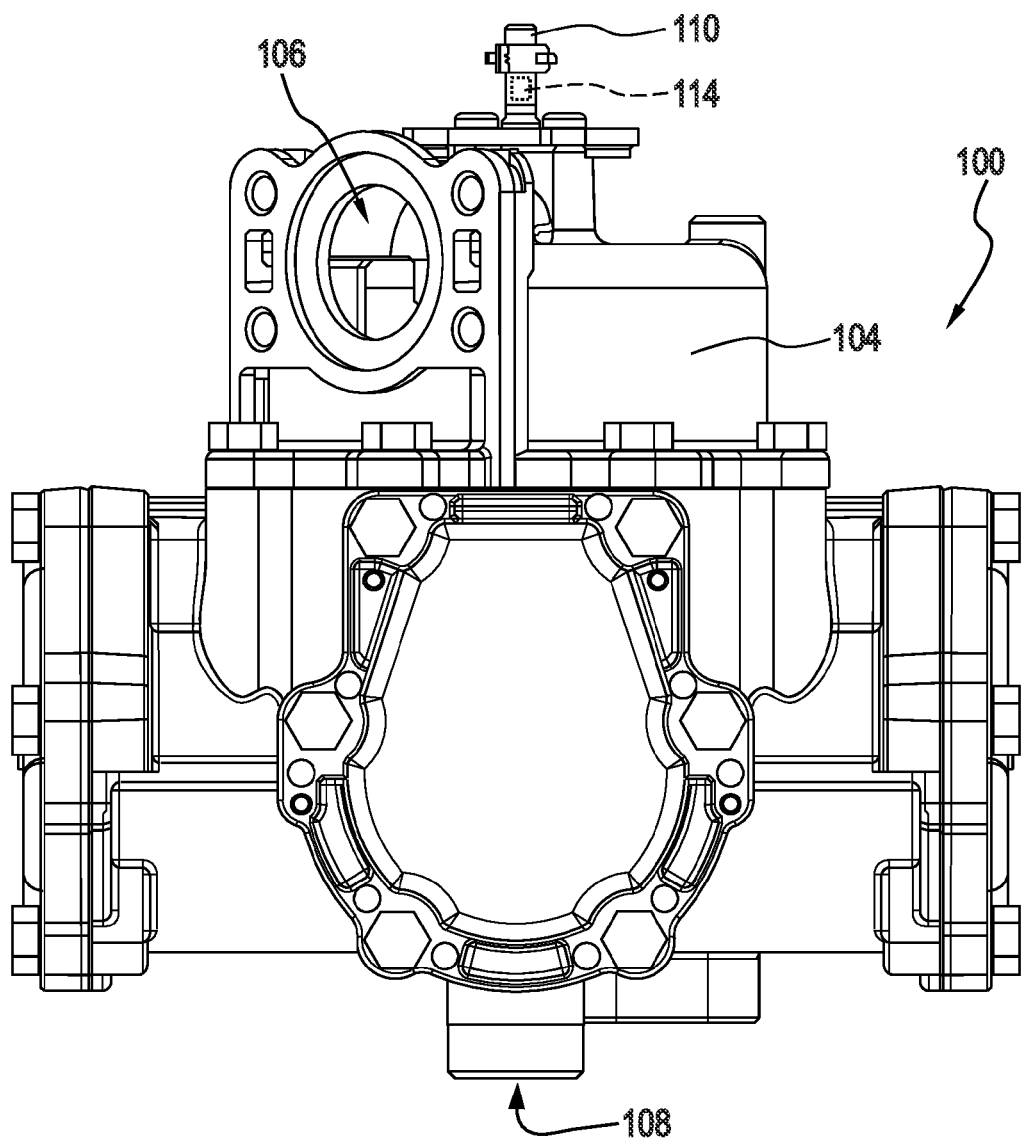
FIG. 5 is a front view of the positive displacement meter of FIG. 4 comprising a transponder coupled with the meter shaft.
Figure 6:
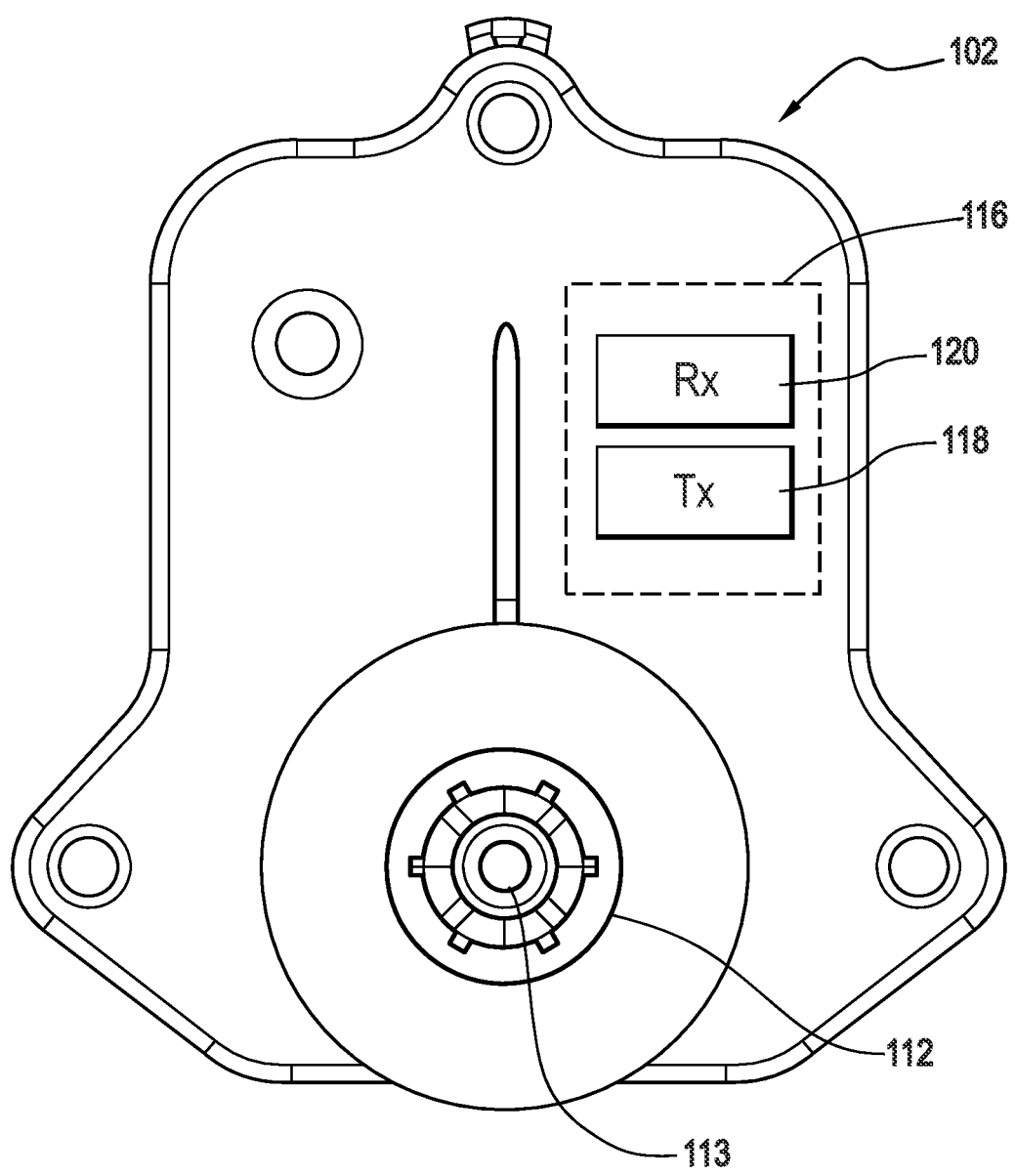
FIG. 6 is a bottom view of the pulser of FIG. 4 comprising interrogator electronics coupled with the pulser.

Some preferred embodiments of the present invention provide at least one transponder and interrogator electronics associated with a fuel flow meter and a displacement sensor. The interrogator electronics may be in periodic or continuous remote electronic communication with the at least one transponder to detect and prevent fraud caused by tampering with the displacement sensor. In this regard, FIG. 5 shows positive displacement meter 100 wherein a transponder 114 is coupled with meter shaft 110. FIG. 6 is a bottom view of pulser 102 wherein interrogator electronics 116 are coupled with pulser 102.

More specifically, referring first to FIG. 5, transponder 114 (shown schematically to facilitate illustration) is preferably configured to rotate with shaft 110 as fuel flows through meter 100. Transponder 114 may preferably be similar to transponder 52, described above. As shown, transponder 114 may be coupled with the distal end of meter shaft 110. However, it will be appreciated that transponder 114 may be disposed in any suitable location along shaft 110 or coupled with another suitable rotational component of meter 100. Also, in other embodiments described below, one or more transponders 114 may be coupled with a disc that is operatively connected to and rotates with shaft 110. In one preferred embodiment, transponder 114 may be permanently embedded in shaft 110 to prevent removal. Where transponder 114 is permanently attached to shaft 110, it may be desirable to form transponder 114 as a passive element to preclude the need for battery replacement. Additionally, a single transponder 114 is coupled with shaft 110 in this embodiment, but embodiments are contemplated in which a plurality of transponders 114 may be provided as described below.

Referring also to FIG. 6, interrogator electronics 116 may be disposed on pulser 102 so that interrogator electronics 116 may communicate with transponder 114. Those of skill in the art can select a suitable location for interrogator electronics 116 based on the communication requirements for a particular application, antenna topography and polarization, and optimal power transfer, among other factors. As shown, for example, interrogator electronics 116 may be affixed to a bottom surface of pulser 102 in close proximity to the connection between shafts 110, 113. Interrogator electronics 116 may be coupled with pulser 102 by any suitable method, including adhesive. In some embodiments, interrogator electronics 116 may be disposed within pulser 102. In other embodiments described below, interrogator electronics 116 may not be coupled with pulser 102, but rather be independently positioned above a vapor barrier in the fuel dispenser's electronics compartment. Also, in some embodiments the interrogator electronics may be positioned within the electronics compartment while antenna(s) associated with the interrogator electronics are positioned within the fuel dispenser's hydraulics compartment, in closer proximity to transponder 114. Further, in some embodiments more than one interrogator electronics 116 may be provided. In any case, interrogator electronics 116 is preferably in electronic communication with the pulser electronics and/or the fuel dispenser control system.

Interrogator electronics 116 are adapted to provide wireless communications with transponder 114. Thus, interrogator electronics 116 preferably comprise a transmitter 118 and a receiver 120 with associated antennas. Transmitter 118 and receiver 120 operate to transmit data to and receive data from transponder 114. Interrogator electronics 116 may also include various communications electronics. For example, such communications electronics may comprise a communications controller associated with a memory having the software necessary to operate interrogator electronics 116 and communicate with a fuel dispenser control system, such as control system 34 described above.

Based on the above, embodiments of the present invention provide a number of methods for detecting and preventing fraud. According to one embodiment, fuel flow meter 100 and pulser 102 may be wirelessly paired via transponder 114 and interrogator electronics 116. In particular, prior to installation, information to be communicated to interrogator electronics 116, such as a serial number or unique communications ID, may be stored in a memory of transponder 114. Likewise, interrogator electronics 116 may be programmed to require this information in a responsive signal upon initiation of a fueling transaction. Thus, interrogator electronics 116 may "verify" to the fuel dispenser control system that it is coupled to the correct fuel flow meter. The fuel dispenser control system may preferably be programmed to require this verification prior to enabling dispensing. Depending on whether the control system receives this verification from interrogator electronics 116 after initiation of a transaction, either interrogator electronics 116 may inform the control system that fraud is suspected or the control system may infer that fraud is suspected.

Figure 7:
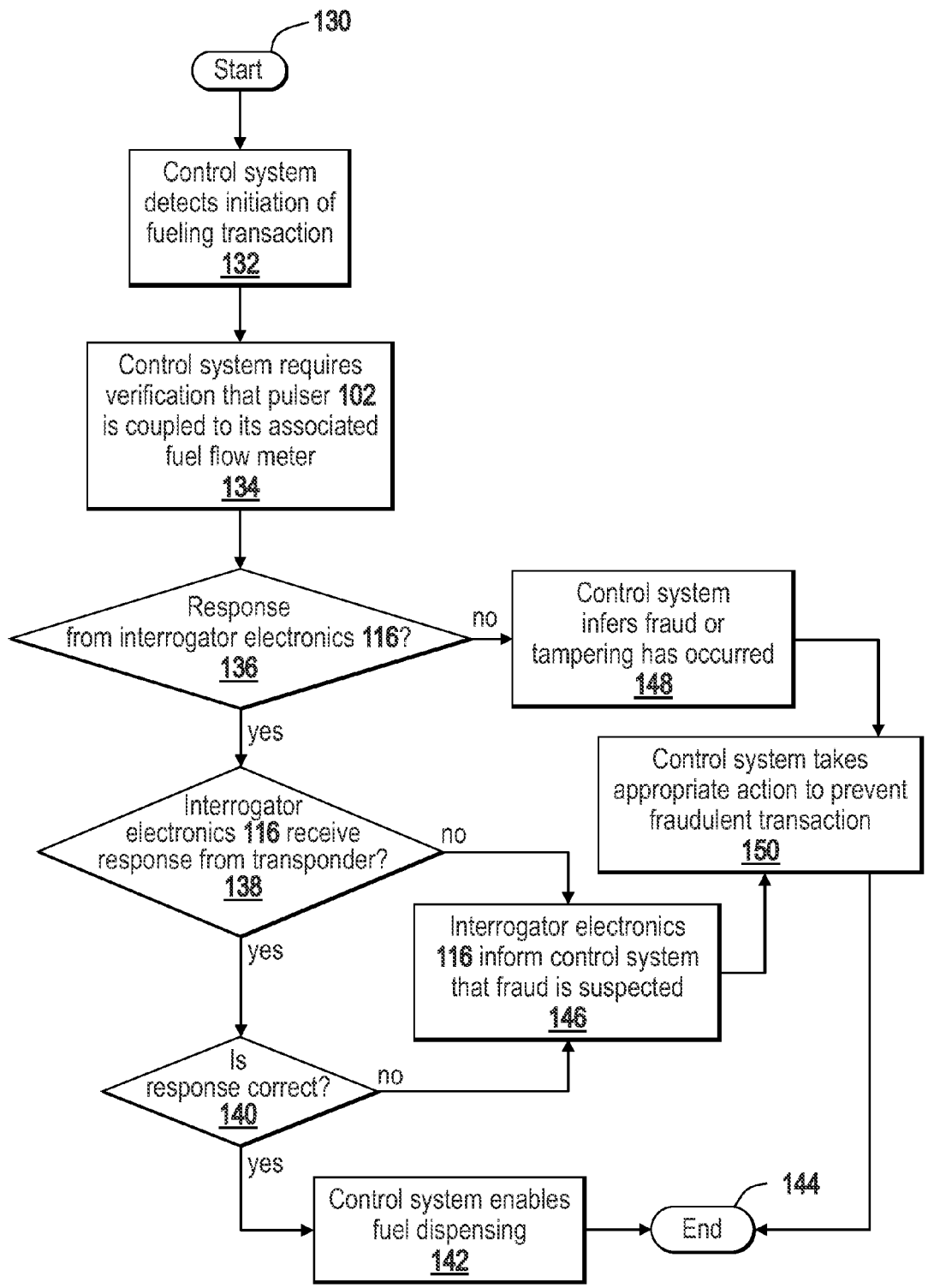
FIG. 7 is a flow chart illustrating an exemplary method for detecting fraud or tampering with a displacement sensor or flow meter according to an embodiment of the present invention.

FIG. 7 is a flow chart illustrating an exemplary method for detecting and preventing fraud according to this embodiment. The process starts (step 130) when a customer initiates a fueling transaction. The fuel dispenser control system may detect initiation of the transaction (step 132) and instruct interrogator electronics 116 (either directly or via the pulser electronics described above) to verify that pulser 102 is coupled to its associated fuel flow meter (here, meter 100) (step 134). The control system may then wait a predetermined time to receive a response from interrogator electronics 116 (step 136).

Where interrogator electronics 116 are present, they may solicit a response from a transponder associated with the fuel flow meter (step 138). If a transponder responds, interrogator electronics 116 may determine whether the response is correct (step 140). If the response is correct, the control system preferably enables fuel dispensing (step 142) and the process ends (step 144).

If interrogator electronics 116 receive an incorrect response from transponder 114 (such as an incorrect serial number), interrogator electronics 116 may infer that pulser 102 has been removed from its associated meter and replaced on a meter with a different transponder or that transponder 114 has been replaced in fuel meter 100. Also, if interrogator electronics 116 receive no response from a transponder within a predetermined period of time, interrogator electronics 116 may infer that pulser 102 has been replaced on a meter without a transponder or that transponder 114 has been removed from fuel meter 100. In either case, interrogator electronics 116 may inform the control system that fraud is suspected (step 146) because pulser 102 is either connected to an unknown meter or transponder 114 has been tampered with.

Additionally, where the control system does not receive a verification from interrogator electronics 116 after a customer has initiated a transaction, the control system may infer that pulser 102 has been removed from flow meter 100. Thus, the control system may infer that fraud or tampering has occurred (step 148). (It will be appreciated that the control system or interrogator electronics 116 may also periodically check for lack of an expected responsive signal from transponder 114 while the transaction is ongoing.) Then, the fuel dispenser control system may take appropriate action to address the fraud (step 150), such as by preventing fueling, alerting a fuel station operator, and/or sounding an alarm. The process then ends (step 144).

In another embodiment, the interrogator electronics may be used to store information on the transponder representative of the fuel flow meter's history and performance. For example, interrogator electronics 116 may be configured for both reading from and writing to transponder 114. Thereby, the fuel dispenser control system may periodically instruct interrogator electronics 116 to store, for example, various maintenance, error, and/or operational status data on transponder 114 for later retrieval. This data may include the total volume of fuel passed through meter 100, the number of times a fuel filter has been changed, or calibration factors. For example, where authorized maintenance personnel change the filter associated with meter 100, the personnel may enter this information in a "manager's keypad" at the fuel dispenser. Then, the control system may instruct interrogator electronics to write this information to transponder 114. Additionally, authorized personnel may use the manager's keypad and/or a remote control system (such as a site controller) to request specific data stored on transponder 114 to obtain the operational history of flow meter 100. Where a discrepancy exists for a particular data metric, this may indicate that fraud has occurred.

According to a further embodiment, where at least one transponder is coupled with a fuel flow meter and associated with at least one interrogator electronics, wireless communications between the transponder and interrogator electronics during rotation of a shaft of the fuel flow meter may be used to "audit" the output of the displacement sensor to ensure that tampering has not occurred. For example, interrogator electronics 116 may be configured to read from transponder 114 once per rotation of shaft 110 as transponder 114 rotates through the field pattern of antenna(s) associated with interrogator electronics 116. Interrogator electronics 116 may then communicate a successful read to the fuel dispenser control system. Also, as described above, pulser 102 may be configured to output to a fuel dispenser control system a pulse series, wherein each pulse represents a known volume of fuel passing through flow meter 100.

Thus, the fuel dispenser control system may be configured to compare the number of pulses it has received with the number of times interrogator electronics 116 has read from transponder 114. Specifically, if pulser 102 typically outputs 100 pulses during one rotation of shaft 110, the fuel dispenser control system may expect one read of transponder 114 for every 100 pulses. Where a discrepancy exists (e.g., 3 reads of transponder 114 but only 200 pulses received), the fuel dispenser control system may infer that pulser 102 has been tampered with and may take appropriate action to prevent fraud. Additionally, those of skill in the art will appreciate that a fuel dispenser control system may correlate reads of a transponder with the output from any compatible type of displacement sensor as described above.

According to a further embodiment, a plurality of transponders may be coupled with a flow meter shaft such that wireless communications between interrogator electronics and the transponders may encode rotation of the flow meter shaft. Such an embodiment may be used to audit the output of a displacement sensor to detect tampering, as described above, or as a displacement sensor itself. More particularly, for example, a plurality of transponders (which may preferably be similar to transponder 114) may be disposed or embedded around the circumference of shaft 110 such that each transponder passes through the field pattern of antenna(s) associated with interrogator electronics 116 once per rotation of shaft 110. Thus, interrogator electronics 116 may read from each of the plurality of transponders to obtain information representative of the angular position of shaft 110. It will be appreciated that, based on the information transmitted from the transponders, this embodiment may be used as either an absolute or an incremental encoder. Interrogator electronics 116 may communicate this information to the fuel dispenser control system for further processing.

Those of skill in the art can select a suitable number and configuration of transponders operatively connected with the flow meter shaft based on the resolution needed or desired for fuel flow measurement. Additionally, where communications between the plurality of transponders and interrogator electronics are used as a displacement sensor, a displacement sensor according to the prior art (such as a pulser or other encoder) may not be provided in some embodiments. In such a case, the interrogator electronics and/or their associated antenna(s) which read from the plurality of transponders may be coupled with the flow meter or disposed in another suitable location for reading from the transponders.

Figure 8:
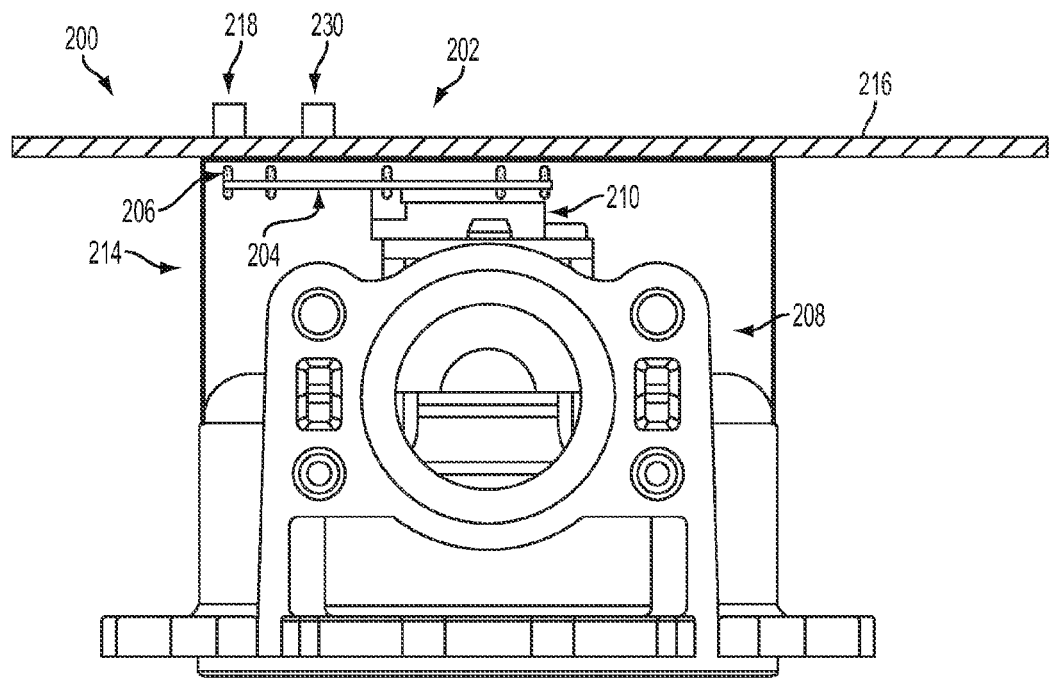
FIG. 8 is a side view of an exemplary fuel flow meter assembly comprising a displacement sensor employing transponders and interrogator electronics constructed in accordance with an embodiment of the present invention.
Figure 9:
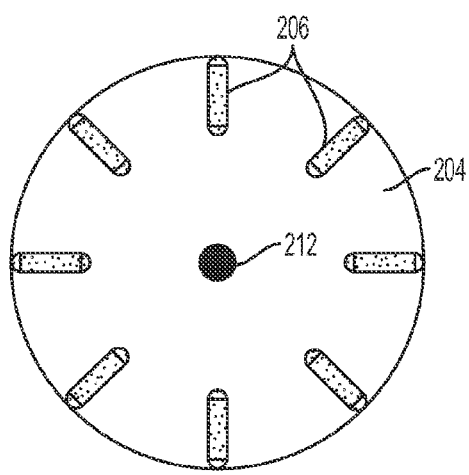
FIG. 9 is a top view of a sensor disc employing a plurality of transponders according to an embodiment of the present invention which may be used with the fuel flow meter assembly of FIG. 8.

For example, in one embodiment of a displacement sensor based on wireless communications between one or more transponders and interrogator electronics, a plurality of transponders may be positioned around the perimeter of a disc. In this regard, FIG. 8 is a side view of an exemplary fuel flow meter assembly 200 comprising a displacement sensor 202 employing transponders and interrogator electronics constructed in accordance with an embodiment of the present invention. FIG. 9 is a top view of a sensor disc 204 employing a plurality of transponders 206 according to an embodiment of the present invention which may be used with fuel flow meter assembly 200.

More particularly, fuel flow meter assembly 200 may comprise a fuel flow meter 208 having an output shaft. Meter 208 may preferably be analogous to meter 100, described above. Sensor disc 204 may preferably be operatively connected with the output shaft of meter 208 such that the disc rotates in a plane perpendicular to the longitudinal axis of the output shaft. In the illustrated embodiment, sensor disc 204 is coupled with the output shaft via a gearbox 210, which may be used to increase or decrease the rate of rotation of disc 204 to increase or decrease the number of revolutions per gallon of fuel measured. For example, gearbox 210 may have a 1:8 ratio in some embodiments. However, gearbox 210 is not required in all embodiments. As noted above, a plurality of transponders 26 are preferably coupled with disc 204. As shown, eight transponders 206 are disposed about the perimeter of disc 204. Disc 204 preferably defines an aperture 212 which may be used to couple disc 204 with an output shaft of gearbox 210.

A plastic cover 214 may be coupled with flow meter 208 and disposed over sensor disc 204 and transponders 206 to provide protection therefor. Cover 214 preferably abuts the fuel dispenser's vapor barrier 216, which may preferably be non-conductive. In some embodiments, vapor barrier 216 may be formed of polycarbonate or another suitable plastic material.

Figure 10:
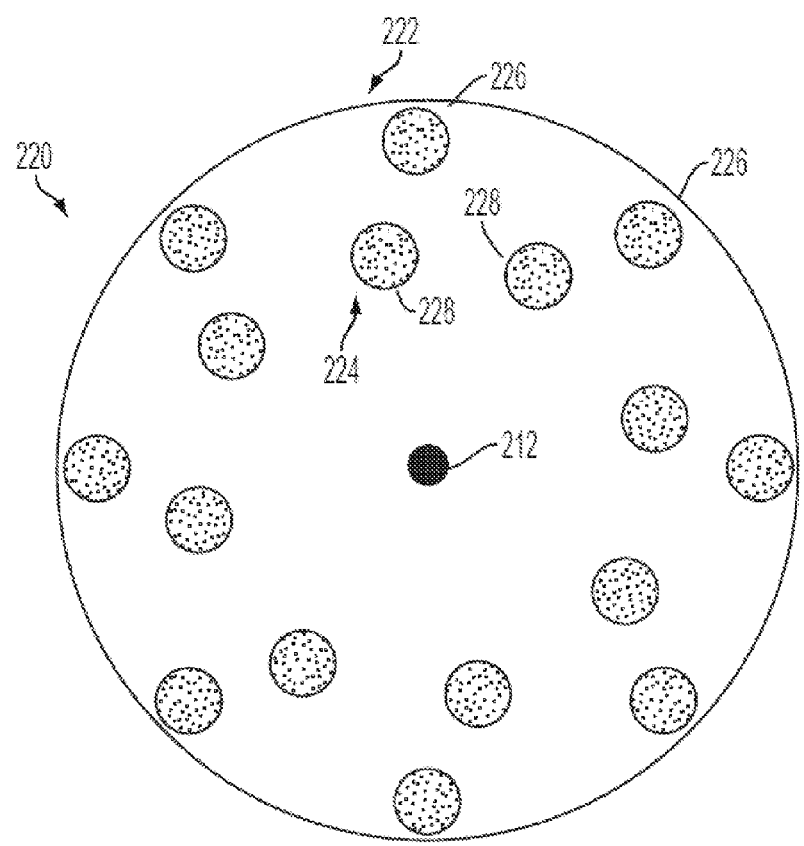
FIG. 10 is a top view of a sensor disc employing two concentric rings of transponders according to an embodiment of the present invention which may be used with the fuel flow meter assembly of FIG. 8.

The plurality of transponders 206 are preferably in electronic communication with at least one interrogator electronics 218 positioned in the electronics compartment. Antenna(s) associated with interrogator electronics 218 are preferably positioned to read from each transponder 206 once per rotation of sensor disc 204 as each transponder 206 passes through the field pattern of the antenna(s). Interrogator electronics 218 are preferably in electronic communication with the fuel dispenser's control system as described above.

Where only a single interrogator electronics 218 is used, displacement sensor 202 may provide information regarding the number of revolutions of the meter 208 output shaft, and thus the volume of fuel dispensed, but it may not be able to provide information regarding the direction of rotation of the output shaft. Hence, FIG. 10 illustrates another embodiment of displacement sensor 202 wherein a sensor disc 220 includes two concentric rings 222, 224 of transponders 226, 228, respectively. The same number of transponders 226, 228 are preferably provided in both the first ring 222 and the second ring 224. Transponders 228 in the second ring 224, which preferably has a smaller radius than first ring 222, are preferably not radially aligned with the transponders 226 in first ring 222, but rather offset therefrom. For example, transponders 228 in second ring 224 may be offset from transponders 226 in first ring 222 an angular amount more or less than one-half of the angular amount between each transponder 226 in first ring 222.

In this embodiment, antenna(s) associated with interrogator electronics 218 read from transponders 226 in first ring 222. Additionally, a second interrogator electronics 230 may be provided having antenna(s) positioned to read from transponders 228 in second ring 224. Those of skill in the art can position the antennas associated with interrogator electronics 218, 230 to provide sufficient isolation therebetween, such that antenna(s) associated with a particular interrogator electronics only read from transponders in the ring which corresponds to that interrogator electronics. Also, in some embodiments, only one interrogator electronics may be used with antennas configured to read from transponders 226, 228 in both rings 222, 224. In operation, depending on the timing or order of signals received from transponders 226, 228 in each concentric circle, a fuel dispenser control system may also determine the direction of rotation of the output shaft of flow meter 208. This embodiment may also increase the resolution of measurement, in that the number of "reads" per revolution of the meter output shaft will double.

According to a further embodiment, a plurality of transponders coupled with a flow meter shaft may communicate with two or more interrogator electronics to provide an absolute displacement sensor. For example, the interrogator electronics may be configured to output a unique digital "word" for each angular position of a flow meter shaft. In this regard, those of skill in the art will appreciate that where n interrogator electronics are provided, $2^n$ positions of the flow meter shaft may be encoded. The number of transponders provided may correspond to the number of distinct angular positions needed or desired, as noted above. Also, more than one transponder may be provided at some angular positions. The topology of the antennas in each transponder at each position may preferably be configured such that, at each angular position of the flow meter shaft, only a predetermined number of the two or more interrogator electronics are able to read from the transponder(s).

For example, the output of the interrogator electronics at each angular position of the flow meter shaft may represent a binary number. In an embodiment where two interrogator electronics, A and B, are provided, four angular positions of the flow meter shaft may be encoded. At the first angular position, no transponders may be coupled with the flow meter shaft, such that neither interrogator electronics A nor B receives a return signal. This may represent the binary value 00. At the second angular position, a transponder may be provided with antenna(s) having topology or orientation such that only interrogator electronics B may read from the transponder. This may represent the binary value 01. Similarly, at the third angular position, the antenna topology or orientation may be read to yield a binary value of 10 (i.e., only interrogator electronics A receives a return signal), while the topology at the fourth angular position may be read to yield a binary value of 11 (i.e., both interrogator electronics A and B receive return signals). Thereby, the interrogator electronics may communicate to a fuel dispenser control system information representative of the absolute position of a flow meter shaft.

Figure 11:
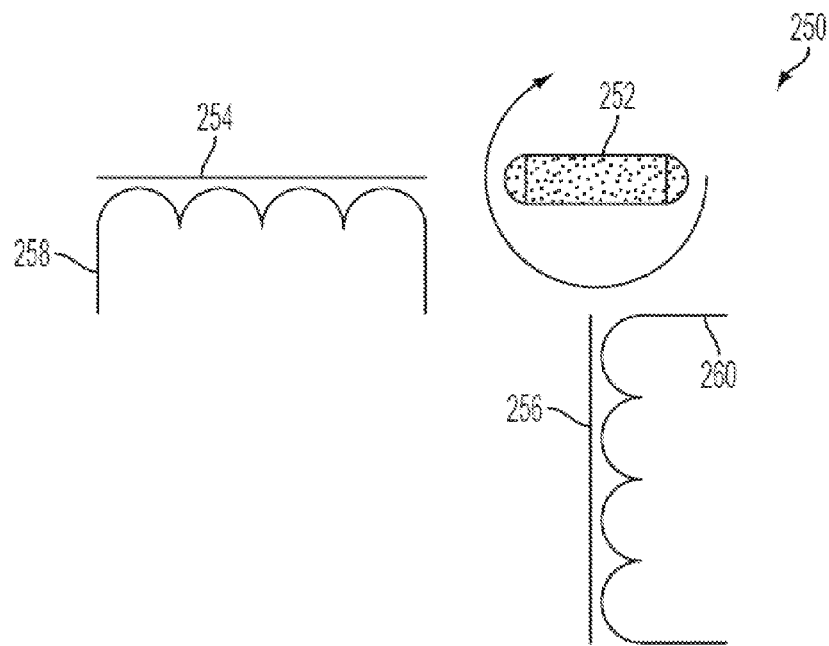
FIG. 11 is a diagrammatic representation of a quadrature displacement sensor constructed in accordance with an embodiment of the present invention comprising a single transponder.

In yet another embodiment, changes in the characteristics of signals transmitted from at least one transponder coupled with a flow meter shaft to interrogator electronics during rotation of the flow meter shaft may be used to obtain information regarding shaft rotation. Thus, this embodiment may be used to "audit" the operation of a displacement sensor and/or may be used as a quadrature displacement sensor itself (i.e., it may provide the relative position and direction of rotation of the meter output shaft). Moreover, because changes in signal characteristics are used to monitor shaft rotation, the signals may concomitantly convey information stored on the transponder (e.g., identification information as described above) to the interrogator electronics. In other words, wireless communications between a transponder and interrogator electronics may be used both as a security device (e.g., to verify that a displacement sensor is coupled with a particular flow meter) and as a displacement sensor or encoder. In this regard, FIG. 11 is a diagrammatic representation of a quadrature displacement sensor 250 constructed in accordance with an embodiment of the present invention comprising a single transponder 252.

More particularly, the interrogator electronics and transponder 252 may communicate a plurality of times during a rotation of the output shaft of a flow meter. Those of skill in the art will appreciate that optimal power transfer between two antennas occurs when their polarizations are aligned. Where the orientation of a transponder and interrogator electronics can be controlled, linear-polarized antennas are often used for best performance. However, where an installation requires that a transponder be oriented in a variety of different directions, it may be preferable to provide circular-polarized antenna(s) at the interrogator electronics and a linear-polarized antenna at the transponder. Consequently, the transponder's polarization may be aligned with that of the interrogator electronics in many different orientations.

Therefore, in one embodiment, antenna(s) associated with the interrogator electronics may be circular-polarized. Those of skill in the art would be able to provide circular polarization of antenna(s) associated with interrogator electronics. For example, as shown in FIG. 11, the antennas may comprise two orthogonal dipoles 254, 256 which are driven by feed attachments 258, 260 that are electrically 90 degrees out of phase. Additionally, antenna(s) in transponder 252 may be linear-polarized, as the orientation of transponder 252 will change as the output shaft rotates (indicated by the directional arrow in FIG. 11).

Figure 12:
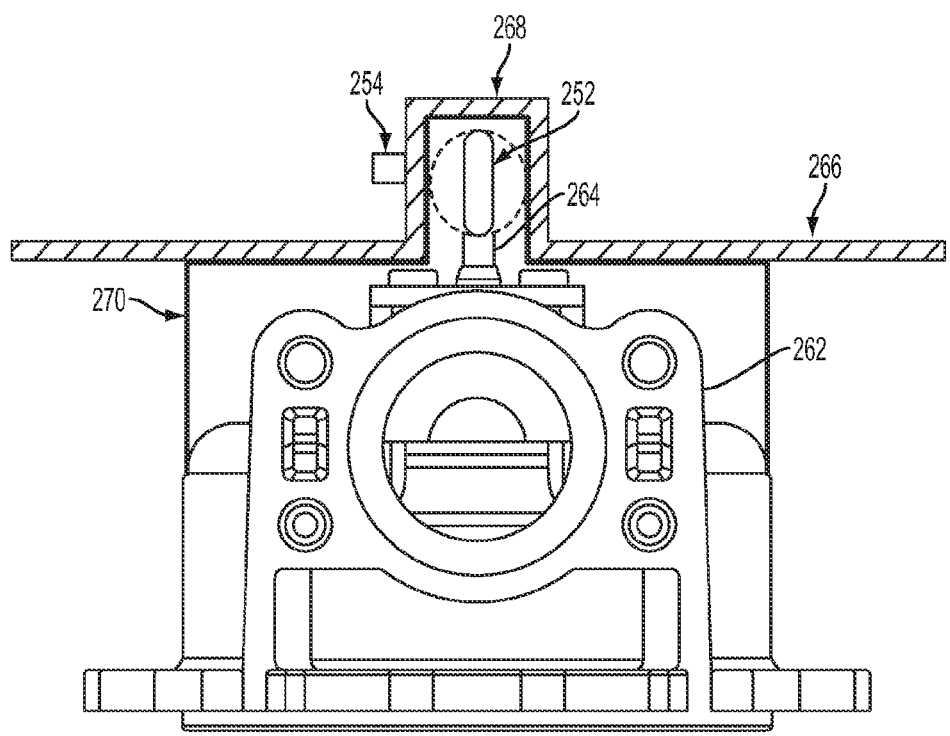
FIG. 12 is a side view of an exemplary positive displacement meter coupled with the displacement sensor of FIG. 11 in accordance with an embodiment of the present invention.

FIG. 12 is a side view of an exemplary positive displacement meter 262 coupled with displacement sensor 250 constructed in accordance with an embodiment of the present invention. Meter 262 is preferably analogous to meter 100, described above, and comprises an output shaft 264 to which transponder 252 may be coupled. In this embodiment, vapor barrier 266, which may again preferably be non-conductive, defines a projecting square chamber 268 in which transponder 252 rotates. A plastic cover 270 may again abut vapor barrier 266, as described above. Only one antenna 254, which may preferably be mounted on chamber 268 and positioned to communicate with transponder 252, is shown in FIG. 12. The other antenna 256 is similarly mounted on chamber 268 in the same plane as antenna 254, but on the axis perpendicular to the page.

Those skilled in the art will also appreciate that as the relative orientations of a transponder and antennas associated with interrogator electronics change, so will the power transferred, the gains of the antennas, the phase of the signals, and the read range, among other signal characteristics. For example, the Friis transmission equation illustrates the relationship between some of these variables:

$$P_T = P_I \frac{G_T(\Theta_I, \Phi_I) G_T(\Theta_T, \Phi_T) \lambda^2}{(4\pi r)^2} (1 - |\Gamma_I|^2)(1 - |\Gamma_T|^2)|\hat{p}_I \cdot \hat{p}_T|^2$$

where $P_T$ is the power received at the transponder, $P_I$ is the power transmitted from the interrogator electronics, $(\theta_T, \Phi_T)$ are the spherical coordinates defining the orientation of the transponder, $(\theta_I, \Phi_I)$ are the spherical coordinates defining the orientation of the interrogator electronics, $G_T(\theta_T, \Phi_T)$ is the gain of the transponder, $G_I(\theta_I, \Phi_I)$ is the gain of the interrogator electronics, $\Gamma_T$ is the transponder reflection coefficient, $\Gamma_I$ is the interrogator electronics reflection coefficient, $\hat{p}_T$ is the polarization vector of the transponder, $\hat{p}_I$ is the polarization vector of the interrogator electronics, r is the distance between the interrogator electronics and the transponder, and $\lambda$ is the wavelength of the signal.

In one embodiment, either or both of the interrogator electronics and the transponder may comprise a received signal strength indicator (RSSI) to provide a measure of the power input to their respective antennas. For example, the interrogator electronics associated with antennas 254, 256 in FIGS. 11-12 preferably comprise RSSI electronics for reading the strength of the signals received from transponder 252. In some embodiments, the interrogator electronics may preferably be analogous to the TRF7960 HF reader offered by Texas Instruments, Inc., which has an RSSI function. Those of skill in the art are familiar with other commercially available interrogator electronics and/or transceivers comprising suitable RSSI electronics for this purpose. As described above, as the relative orientation of transponder 252 with respect antennas 254, 256 changes, so will the antenna gains—and thus the power received—at a particular antenna. Thus, reading received signal strength from transponder 252 and applying simple geometry allows the interrogator electronics to calculate the angular position of the output shaft of a flow meter. According to a further embodiment, the interrogator electronics may be configured to detect changes in the phase of the signals transmitted from transponder 252 during rotation of the output shaft.

In either case, either the interrogator electronics or the fuel dispenser control system may use these changes in signal characteristics to monitor the rotational speed, direction, and/or position of flow meter 262 output shaft 264. In other embodiments wherein displacement sensor 250 is used in conjunction with prior art displacement sensors, such as pulsers, this information may be used to verify that the prior art displacement sensor has not been tampered with, such as by comparing rotation with an expected number of pulses, as described above. Additionally, it will be appreciated that this embodiment may detect tampering wherein a tamperer attempts to pry meter 262 from its mount. Specifically, any tampering would bring transponder 252 out of the field patterns of antennas 254, 256, causing a loss of contact. Because transponder 252 may typically be in contact with at least one of antennas 254, 256 during normal operation, the interrogator electronics and/or the fuel dispenser control system may indicate that tampering has occurred if contact with both antennas 254, 256 is lost for a predetermined period of time.

Depending on the rate of rotation of output shaft 264, it may be difficult to interrogate transponder 252 a desired number of times during one rotation of shaft 264 to obtain its angular position at a desired resolution. Thus, in some embodiments, it may be desirable to increase the resolution of shaft position measurements by providing more than two dipole elements. This may enable the interrogator electronics to read from transponder 252 a greater number of times during each rotation of the shaft.

According to further embodiments, capacitive sensors may be used to encode rotation of the output shaft of a flow meter and detect fraud. Those of ordinary skill in the art are familiar with capacitive sensing electronics which, upon detection of an abrupt change in capacitance, such as that caused by a user bringing a finger in proximity to or moving a finger away from sensing electrodes, triggers a predetermined event. The capacitive sensing electronics may comprise, for example, a dedicated integrated circuit or software aided by internal hardware resources on a microcontroller. Additionally, the capacitive sensing electronics are typically capable of processing signals received over multiple input channels.

These embodiments may preferably be used in conjunction with an embodiment of a displacement sensor using wireless communication between transponders and interrogator electronics to encode rotation of the flow meter's output shaft, including but not limited to the embodiments described above with respect to FIGS. 8-12, although this is not required. For example, a fuel dispenser control system may use the output of the capacitive sensor encoder to audit the output of the transponder/interrogator encoder to ensure accuracy and that fraud has not occurred.

In this regard, FIG. 13 is a side view of an exemplary fuel flow meter assembly 270 comprising a capacitive displacement sensor 272 constructed in accordance with an embodiment of the present invention. Fuel flow meter assembly 270 may further comprise a fuel flow meter 274, which may preferably be analogous to meter 100, discussed above. Capacitive displacement sensor 272 comprises a reader disc 276 and an encoder disc 278. Encoder disc 278 may preferably be coupled for rotation with the output shaft of flow meter 274. A plastic cover 280 may again be coupled with flow meter 274 and surround encoder disc 278. Preferably, plastic cover 280 abuts a vapor barrier 282, which is preferably non-conductive. Reader disc 276, which is preferably stationary, may preferably be disposed coaxially with encoder disc 278 on the upper side of vapor barrier 282 in the fuel dispenser electronics compartment. Because the capacitance between conductive layers on reader disc 276 and encoder disc 278 is proportional to the area of the conductive layers and the dielectric constant and inversely proportional to their separation distance, the size of each disc 276 and 278 and their respective conductor layers will depend in part on the thickness and dielectric constant of vapor barrier 282.

Referring now to FIG. 14A, which is a bottom view of reader disc 276, and FIG. 14B, which is a top view of encoder disc 278, reader disc 276 and encoder disc 278 preferably each comprise printed circuit boards having one or more conductive layers defined thereon. The conductive layers may be formed of a variety of suitable materials, including copper, indium tin oxide, and printed ink. In particular, the conductive layers of reader disc 276 may comprise a central ground plane 280 and a plurality of radial segments 282 defined about the circumference of encoder disc 276. In the illustrated embodiment, eight radial segments 282 are shown, but additional or fewer radial segments may be provided in other embodiments. It will be appreciated that reader disc 276 and encoder disc 278 need not be circular, but may define other shapes in alternative embodiments. Also, in another alternative embodiment, the conductive layers of reader disc 276 may comprise sensing segments on concentric rings and resemble a Gray code wheel (analogous to those used in optical displacement sensors).

Notably, radial segments 282 are isolated from central ground plane 280 by a uniform gap 284. The capacitive sensing electronics apply a voltage to each radial segment 282, and ground plane 280 is connected to ground. Because the electric field energy associated with each radial segment 282 travels across gap 284 to ground plane 280, there will be a parasitic capacitance between each radial segment 282 and ground plane 280. It will be appreciated that, depending on the size of gap 284, some of the energy spills over into the sensing area over the gap, creating fringing electric fields. The size of gap 284 affects the amount of field energy directed to ground plane 280, and thus the parasitic capacitance between each radial segment 282 and ground plane 280. Those of skill in the art can select a suitable size for gap 284 based on the desired parasitic capacitance, but in one embodiment the gap size may be approximately 0.5 mm.

Additionally, encoder disc 278 preferably comprises a single conductive layer 286. In the illustrated embodiment, conductive layer 286 may comprise a circular center portion 288 having the same diameter as ground plane 280 of reader disc 276 and a radial portion 290 extending between center portion 288 and the periphery of encoder disc 278. Preferably, radial portion 290 extends through a larger angle than each radial segment 282, such that radial portion 290 may overlap two or more radial segments 282 when reader disc 278 is positioned beneath encoder disc 276. This may allow the capacitive sensing electronics to determine the direction of rotation of encoder disc 278 and thus of the output shaft of flow meter 274.

In operation, as encoder disc 278 rotates with the output shaft of flow meter 274, conductive layer 286 passes beneath ground plane 280 and each radial segment 282 in sequence. Conductive layer 286 adds conductive surface area, and thus additional charge capacity, to the capacitive system between ground plane 280 and a particular radial segment 282. Capacitive sensing electronics in electrical communication with capacitive displacement sensor 272 may monitor changes in capacitance across each radial segment 282 and ground plane 280 of reader disc 276 caused by the rotation of encoder disc 278. Because the capacitive sensing electronics may process signals received over multiple input channels, the capacitive sensing electronics can preferably determine which radial segment 282 conductive layer 286 is passing at a given instant. Thereby, capacitive sensing electronics may determine the rotational speed, direction of rotation, and position of the output shaft of flow meter 274. As noted above, displacement sensor 272 may thus be used to audit the output of a displacement sensor using wireless communication between transponders and interrogator electronics to ensure accuracy and that fraud has not occurred. Alternatively, displacement sensor 272 may be used alone to encode rotation of the output shaft of flow meter 274.

Further, embodiments of capacitive displacement sensor 272 may also provide for proximity sensing or liftoff detection to prevent fraud. In particular, at any given time the capacitive sensing electronics can detect increased capacitance at a particular radial segment 282 of reader disc 276 caused by proximity to conductive layer 286 of encoder disc 278. If the capacitive sensing electronics detect low capacitance at all radial segments 282, the capacitive sensing electronics may determine that encoder disc 278 is not in proximity to reader disc 276 and take appropriate action to prevent fraud. Alternatively, capacitive displacement sensor 272 may be used in conjunction with a transponder coupled with flow meter 274 and an antenna coupled with reader disc 276. The antenna may be associated with interrogator electronics which may be used to wirelessly "pair" displacement sensor 272 with flow meter 274, as described above. Thus, if a tamperer attempts to move or remove flow meter 274, doing so would bring the transponder out of range of the antenna.

Figure 15:
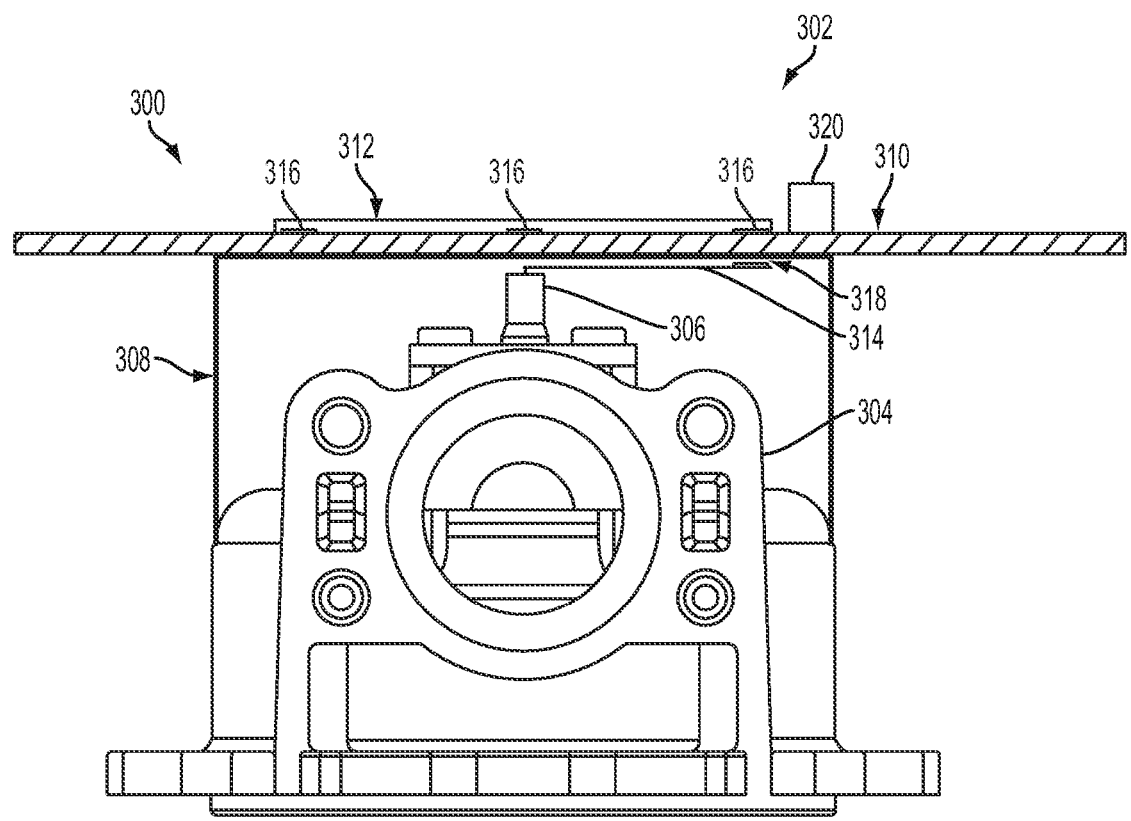
FIG. 15 is a side view of an exemplary fuel flow meter assembly comprising a capacitive displacement sensor constructed in accordance with another embodiment of the present invention.

Next, a capacitive displacement sensor according to a further embodiment of the present invention is described with reference to FIGS. 15 and 16. In particular, FIG. 15 is a side view of a fuel flow meter assembly 300 comprising a capacitive displacement sensor 302. Fuel flow meter assembly 300 may preferably be similar to fuel flow meter assembly 270 in many respects. Thus, fuel flow meter assembly 300 may comprise a flow meter 304 having an output shaft 206. Further, fuel flow meter assembly 300 may comprise a plastic cover 308 abutting a vapor barrier 310. In this embodiment, however, capacitive displacement sensor 302 preferably comprises a reader disc 312 and an arm 314 having a length approximately equal to the radius of reader disc 312. Reader disc 312, which is again preferably stationary, may preferably be disposed coaxially with output shaft 306 on the upper side of vapor barrier 310 in the fuel dispenser electronics compartment. Arm 314 is preferably coupled at a proximal end thereof to output shaft 306 such that arm 314 rotates in a plane perpendicular to the longitudinal axis of output shaft 306. Those of skill in the art will appreciate that, in other embodiments, arm 314 may instead define a disc or another suitable shape which rotates perpendicular to the longitudinal axis of output shaft 306.

Figure 16:
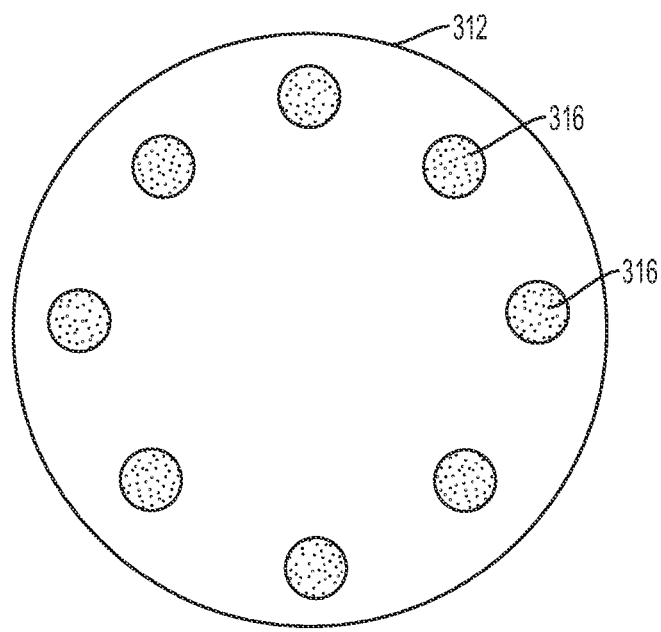
FIG. 16 is a bottom view of a reader disc which may be used with the capacitive displacement sensor shown in FIG. 15 according to an embodiment of the present invention.

Referring now to FIG. 16, which is a bottom view of reader disc 312, a plurality of conductive pads 316 are preferably coupled with disc 312. As shown, 8 conductive pads 316 are disposed about the perimeter of disc 312. In one embodiment, disc 312 may comprise a printed circuit board, and conductive pads 316 may be formed of a variety of suitable conductive materials as noted above.

Arm 314, which in this embodiment may preferably be formed of a non-conductive material, preferably comprises at least one capacitive element 318 positioned at a distal end thereof. Capacitive element 318 may preferably be similar to a traditional passive transponder comprising a capacitor and a receiver, but rather than being configured to transmit a radio-frequency signal in response to interrogation, capacitive element 318 may be charged in response to interrogation and may apply a voltage to an electrode in capacitive element 318. Preferably, capacitive element 318 is coupled with arm 314 at a radial distance from output shaft 306 which corresponds to the radial distance of conductive pads 316 on reader disc 312. Thus, as arm 314 rotates with output shaft 306, capacitive element 318 may pass directly beneath each conductive pad 316. Capacitive element 318 is preferably in electronic communication with at least one interrogator electronics 320 positioned in the electronics compartment. Interrogator electronics 218 are preferably in electronic communication with the fuel dispenser's control system as described above.

In operation, antenna(s) associated with interrogator electronics 320 are preferably positioned to "interrogate," or charge, a capacitor in capacitive element 318 a plurality of times during a revolution of shaft 306. Additionally, conductive pads 316 may preferably be in parallel electrical communication with interrogator electronics 320, although in some embodiments conductive pads 316 may be connected in series. When capacitive element 318 is charged by receiving a signal from antenna(s) associated with interrogator electronics 320, it applies a voltage to an electrode as noted above. When capacitive element 318 passes beneath a particular conductive pad 316, the energy stored in capacitive element 318 may pass from the electrode to the conductive pad 316, such that there is a parasitic capacitance between capacitive element 318 and a conductive pad 316. This capacitive coupling completes a circuit monitored by interrogator electronics 320. When capacitive element 318 is charged but is not beneath a conductive pad 316, the electrical energy stored therein will not have a path to ground.

Figure 17:
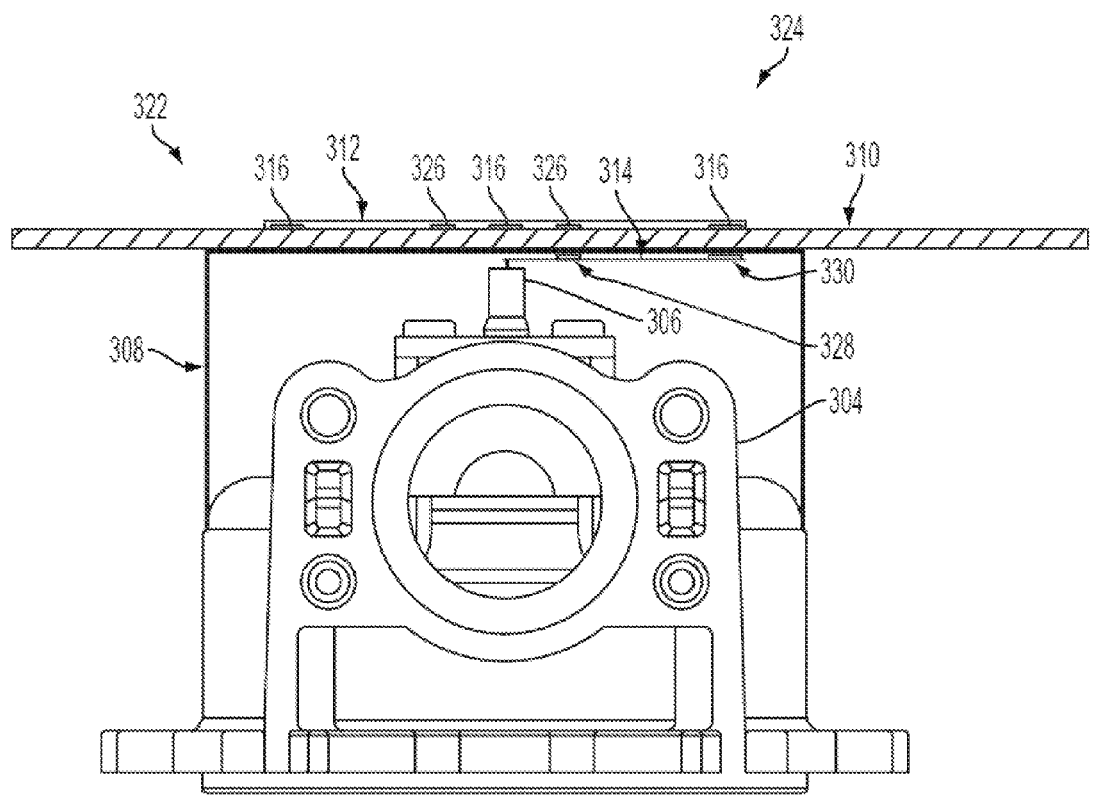
FIG. 17 is a side view of an exemplary fuel flow meter assembly comprising a capacitive displacement sensor constructed in accordance with another embodiment of the present invention.
Figure 18:
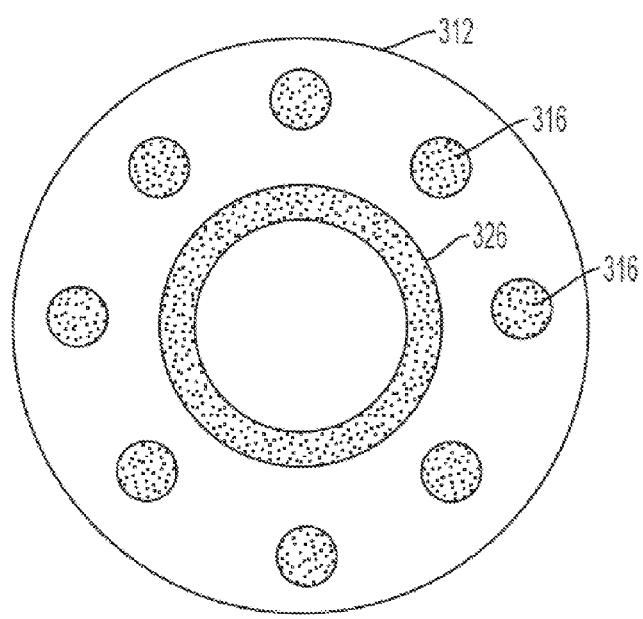
FIG. 18 is a bottom view of a reader disc which may be used with the capacitive displacement sensor shown in FIG. 17 according to an embodiment of the present invention.

FIGS. 17 and 18 illustrate a further embodiment of a capacitive displacement sensor. FIG. 17 is a side view of a fuel flow meter assembly 322 comprising a capacitive displacement sensor 324. FIG. 18 is a bottom view of a reader disc 312 for capacitive displacement sensor 324. Fuel flow meter assembly 322 is preferably similar to fuel flow meter assembly 300 in many respects, and like reference numerals are used in FIGS. 17 and 18 to denote like elements.

However, in this embodiment capacitive displacement sensor 324 does not include interrogator electronics 320 or capacitive element 318. Instead, capacitive displacement sensor 324 comprises a reader disc 312 having a central signal ring 326, which may preferably be formed of a conductive material similar to that of conductive pads 316. Additionally, in this embodiment arm 314 preferably comprises an inner conductive element 328 and an outer conductive element 330. Conductive elements 328, 330 are preferably in electrical communication along arm 314, such as via a conductive trace or the like. Inner conductive element 328 is preferably coupled with arm 314 at a radial distance from output shaft 306 which corresponds to the radius of signal ring 326 on reader disc 312, and outer conductive element 330 is preferably coupled with arm 314 at a radial distance from output shaft 306 which corresponds to the radial distance of conductive pads 316 on reader disc 312. Conductive elements 328, 330 may be formed of a variety of suitable conductive materials, such as those specified above or otherwise known to those of skill in the art. Thus, as arm 314 rotates with output shaft 306, outer conductive element 330 will pass directly beneath each conductive pad 316, and inner conductive element 328 will rotate beneath signal ring 326.

In operation, conductive pads 316 may preferably be in parallel electrical communication with suitable capacitive sensing electronics. Likewise, signal ring 326 may be in electrical communication with the capacitive sensing electronics. The capacitive sensing electronics may preferably apply a voltage to signal ring 326, which as noted above may always be directly above inner conductive element 328 regardless of the position of arm 314. Thus, there may be a parasitic capacitance between signal ring 326 and conductive element 328, and a voltage will be applied to conductive element 330. When conductive element 330 passes beneath a particular conductive pad 316, electrical energy may pass from conductive element 330 to the conductive pad 316, such that there is a parasitic capacitance therebetween. This capacitive coupling completes a circuit monitored by the capacitive sensing electronics. When conductive element 330 is not beneath a conductive pad 316, the voltage applied thereto will not have a path to ground. In other embodiments, such as where reader disc 312 is positioned within the hydraulics compartment of the fuel dispenser, inner conductive element 328 may be in direct physical contact with signal ring 326. Also, it will be appreciated that in other embodiments the capacitive sensing electronics may apply a voltage to each conductive pad 316, rather than to signal ring 326, and operate in a similar fashion.

Hence, in both embodiments illustrated in FIGS. 15-18, interrogator electronics 320 or the capacitive sensing electronics may determine the position, rate of rotation, and direction of rotation of arm 314 as it rotates past each conductive pad 316. Thus, displacement sensors 302, 324 may likewise be used to audit the output of another displacement sensor, or the fuel dispenser control system may use information from displacement sensors 302, 324 to determine the amount of fuel dispensed through flow meter 304. Additionally, both embodiments may provide for proximity sensing or liftoff detection to prevent fraud as described above with respect to the embodiment shown in FIGS. 13-14B.

Further, in both embodiments, to provide an alternative method of sensing direction of rotation, reader disc 312 may have two concentric rings of conductive pads as discussed above with reference to FIG. 10. Then, in the embodiment described with respect to FIGS. 15-16, arm 314 may comprise an additional capacitive element at a radial position corresponding to the radial position of the additional ring of conductive pads 316. Likewise, interrogator electronics 320 may be associated with additional antenna(s) for charging the additional capacitive element on arm 314. Also, in the embodiment described with respect to FIGS. 17-18, arm 314 may comprise an additional conductive element positioned for capacitive coupling with the additional ring of conductive pads 316.

Figure 19:
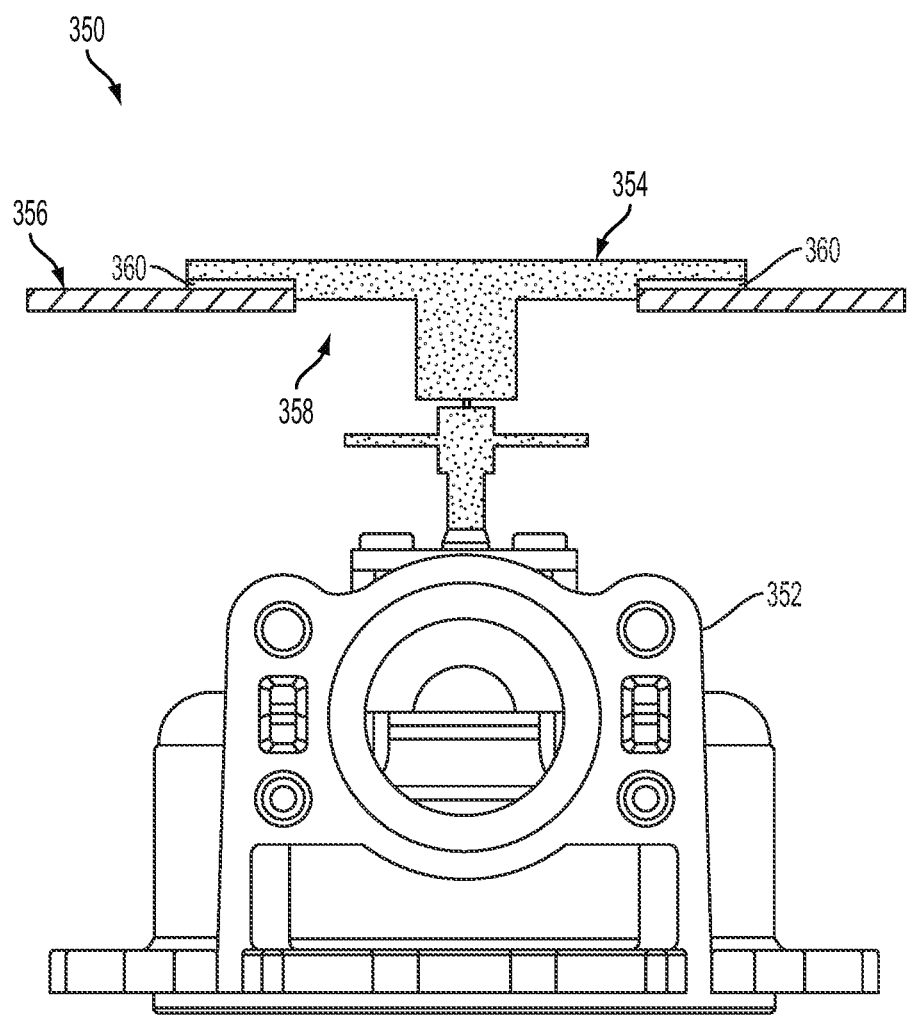
FIG. 19 is a side view of an exemplary fuel flow meter assembly employing capacitive sensing electronics to detect fraud in accordance with an embodiment of the present invention.

A further embodiment of the present invention provides a method for detecting fraud caused by liftoff or removal of a pulser using capacitive sensing. In this regard, FIG. 19 is a side view of a fuel flow meter assembly 350 comprising a flow meter 352 having an output shaft coupled with a pulser 354. Flow meter 352 and pulser 354 may preferably be similar to flow meter 100 and pulser 102, described in detail above. As shown, pulser 354 is disposed above a vapor barrier 356, which in this embodiment is preferably formed of a conductive material, such as metal. Vapor barrier 356 defines an aperture 358, through which the pulser shaft may extend.

Figure 20:
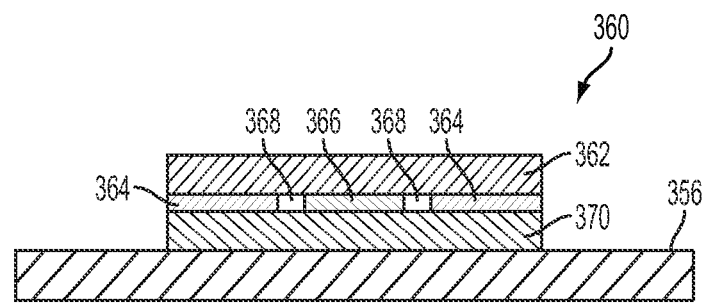
FIG. 20 is a cross-sectional view of a capacitive sensing pad which may be used with the fuel flow meter assembly of FIG. 19.

In this embodiment, pulser 354 is preferably provided with one or more capacitive sensing pads. For example, in FIG. 19 two such capacitive sensing pads 360 are disposed between pulser 354 and vapor barrier 356. Referring also to FIG. 20, which is a cross-sectional view of capacitive sensing pad 360 coupled with vapor barrier 356, capacitive sensing pad 360 may comprise a printed circuit board 362 having conductive layers defined thereon. The conductive layers may be formed of a variety of suitable materials, including copper, indium tin oxide, and printed ink, as explained above. In particular, the conductive layers of sensing pad 360 may comprise a ground plane 364 which surrounds an electrode 366. As with reader disc 276 described above, ground plane 364 and electrode 366 are separated by a gap 368. Capacitive sensing electronics preferably apply a voltage to electrode 366, whereas ground plane 364 is connected to ground. Because the electric field energy associated with electrode 366 travels across gap 368 to ground plane 364, there will be a parasitic capacitance between ground plane 364 and electrode 366.

A second printed circuit board 370 may overlay ground plane 364, electrode 366, and gap 368. In one embodiment, printed circuit boards 362, 370 may be 0.5 mm thick FR-4 printed circuit boards. As shown in FIGS. 19 and 20, capacitive sensing pad 360 is preferably coupled with pulser 354 and then pressed tightly against metallic vapor barrier 356 when pulser 354 is coupled with meter 352. Vapor barrier 356 adds conductive surface area, and thus additional charge capacity, to the capacitive system between ground plane 364 and electrode 366. Capacitive sensing electronics in electrical communication with capacitive sensing pad 360 may monitor for changes in capacitance between ground plane 364 and electrode 366. In operation, where a tamperer attempts to remove pulser 354 from meter 352, capacitive sensing pad 360 will move away from vapor barrier 356, causing a decrease in capacitance. The capacitive sensing electronics sense this decrease and may take appropriate action to prevent fraud.

Figure 21:
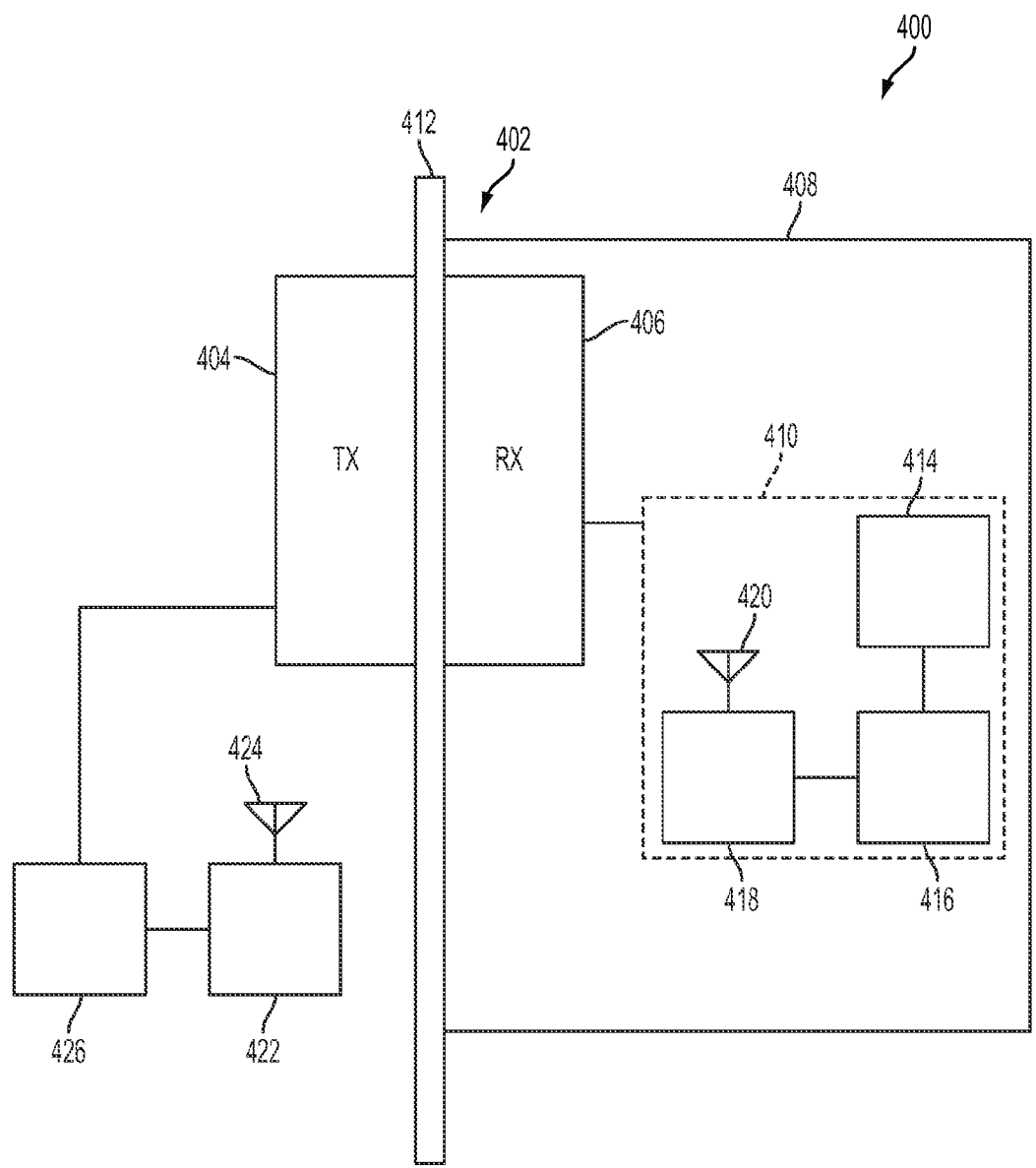
FIG. 21 is a schematic diagram of a fuel flow meter assembly comprising contactless power transfer electronics according to an embodiment of the present invention.

FIG. 21 is a schematic diagram of a fuel flow meter assembly 400 comprising contactless power transfer electronics 402 according to one embodiment of the present invention. As described below, contactless power transfer electronics 402 may be used to detect fraud and provide power to a displacement sensor located beneath a fuel dispenser vapor barrier. Those of ordinary skill in the art are familiar with commercially available contactless power transfer electronics, such as the wireless charging solution offered by Texas Instruments, Inc. In one embodiment, contactless power transfer electronics 402 may be similar to electronics used for recharging wireless devices in accordance with standards defined by the Wireless Power Consortium.

More particularly, contactless power transfer electronics 402 preferably comprise transmitter electronics 404 and receiver electronics 406. Transmitter electronics 404 may comprise a power driver stage, such as a switching regulator or a class D amplifier, and a processor, such as a microcontroller or the like. The power driver stage may drive a loop antenna at a predetermined frequency to transmit power to receiver electronics 406 via inductive coupling. Similarly, receiver electronics 406 may comprise a loop antenna which delivers power to a rectifier and, ultimately, to the attached load. Receiver electronics 406 may also comprise a processor which monitors the process and sends digital data back over the low frequency link to convey information to transmitter electronics 404.

Meter assembly 400 preferably comprises a plastic cover 408, as described above, which encases displacement sensor electronics 410. Cover 408 preferably abuts the fuel dispenser's vapor barrier 412, which may preferably be non-conductive in this embodiment. As shown in FIG. 21, transmitter electronics 404 are preferably provided in the fuel dispenser's electronics compartment adjacent vapor barrier 412, and receiver electronics 406 are preferably coupled to the surface of cover 408 abutting vapor barrier 412 directly opposite transmitter electronics 404. Thereby, transmitter electronics 404 may deliver power to receiver electronics 406 across vapor barrier 412 and through cover 408 via inductive coupling. Receiver electronics 406 may deliver power to displacement sensor electronics 410.

Displacement sensor electronics 410 preferably comprise a displacement sensor 414 operatively connected to a fuel flow meter, a processor 416, a transceiver 418 having an antenna 420, all in electronic communication. In one embodiment, displacement sensor 414 may be a traditional pulser. In other embodiments, displacement sensor 414 may be integrated with the fuel flow meter housing, for example including a pickoff coil or hall effect sensor. Additionally, in some embodiments all components of displacement sensor electronics 410 may be integral with the fuel flow meter housing.

To transmit information output from displacement sensor 414 across vapor barrier 412, transceiver 418 is preferably in remote electronic communication with a similar transceiver 422 having an antenna 424 disposed within the fuel dispenser's electronics compartment. Transceivers 418, 422 may preferably comprise low power UHF transceivers, and in one embodiment they may transfer data at a frequency of 915 MHz. A fuel dispenser control system 426 is preferably in electronic communication with transceiver 422 and transmitter electronics 404. Preferably, processor 416 may process information provided from displacement sensor 414 and provide it to transceiver 418. Transceiver 418 may then transmit the information to transceiver 422, which provides the information to fuel dispenser control system 426. In an alternative embodiment, information from displacement sensor 414 may be provided to receiver electronics 406, which may transfer the information to transmitter electronics 404 via the inductive link.

Notably, in some embodiments, each fuel flow meter in a fuel dispenser may comprise a transceiver 418, but the fuel dispenser may comprise a single transceiver 422. In other words, all meters in a fuel dispenser may transmit fueling information from their respective displacement sensors 414 to a single transceiver 422. Additionally, in some embodiments, fuel dispenser control system 426 may also cause transceiver 422 to write information to processor 416 associated with the fuel flow meter via transceiver 418. Such two way communication between transceivers 418, 422 may be used to combat fraud by wirelessly "pairing" a fuel flow meter with a particular fuel dispenser, as described above.

Further, power transfer electronics 402 may also prevent fraud by detecting an attempt to remove fuel flow meter assembly 400 from the fuel dispenser's hydraulics compartment. In particular, because transmitter electronics 404 may be receiving constant data from receiver electronics 406, transmitter electronics 404 knows when the link is broken. An attempt to move or remove fuel flow meter assembly 400 would pull assembly 400 far enough away from transmitter electronics 404 such that transmitter electronics 404 would flag a disconnect. Thus, transmitter electronics 404 may indicate to fuel dispenser control system 426 that fraud may have occurred.

In accordance with further embodiments of the present invention, remote optical sensors (for example comprising optical fibers or light pipes) may be used to encode rotation of the output shaft of a flow meter and detect fraud. For example, embodiments of the present invention may comprise a fiber optic displacement sensor used in conjunction with an embodiment of a displacement sensor using wireless communication between transponders and interrogator electronics to encode rotation of the flow meter's output shaft, including but not limited to the embodiments described above with respect to FIGS. 8-12. As discussed in more detail below, a fuel dispenser control system may use the output of the transponder/interrogator encoder to audit the output of the fiber optic encoder to ensure accuracy and that fraud has not occurred, or vice versa. One example of a fiber optic displacement sensor which may be used in embodiments of the present invention is discussed below. Additional background regarding fiber optic displacement sensors is provided in U.S. Pat. No. 5,867,403 to Sasnett, Jr. et al., the entire disclosure of which is incorporated herein by reference for all purposes.

Figure 22:
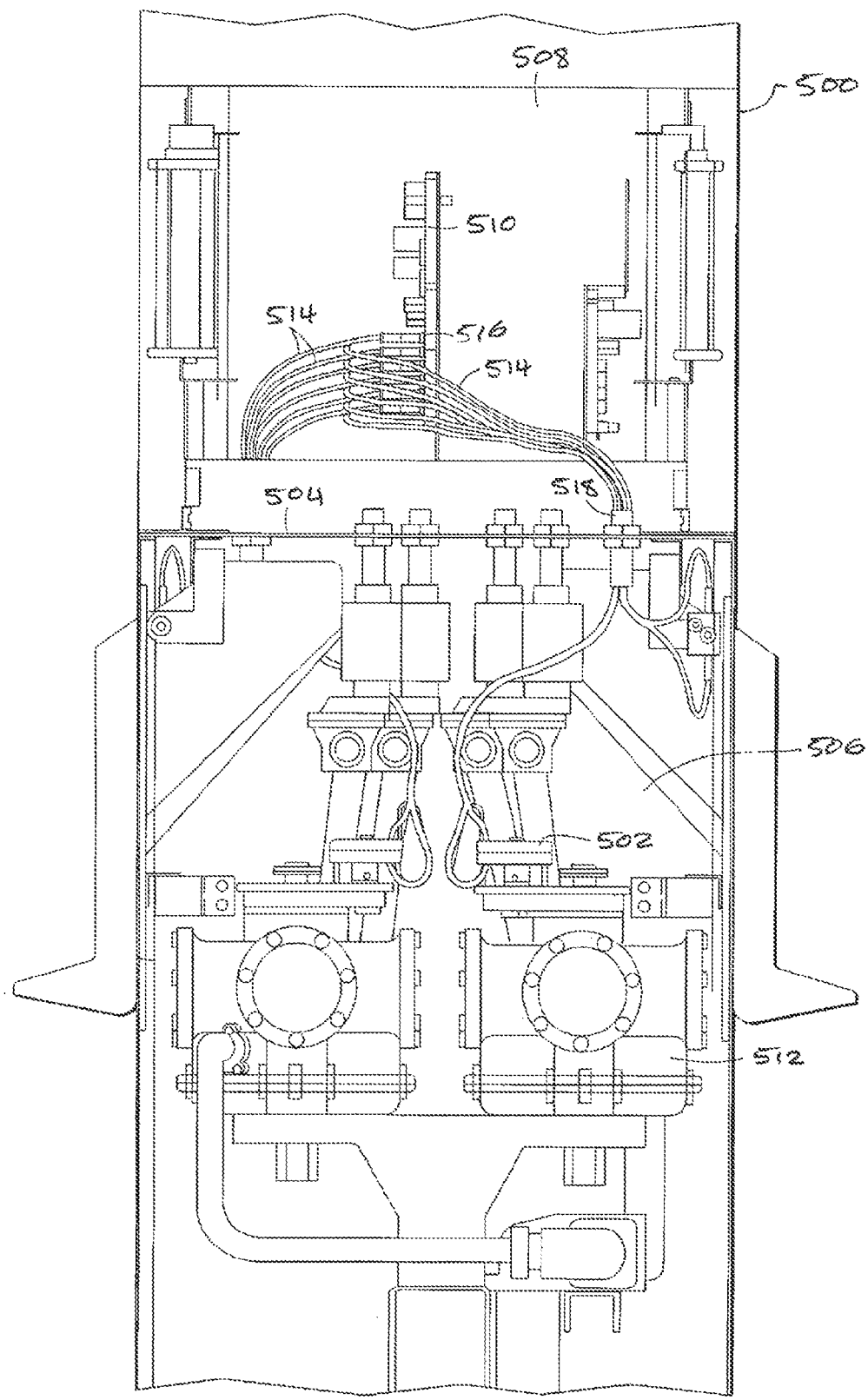
FIG. 22 is an enlarged cross-sectional view of a fuel dispenser including an exemplary fuel flow meter assembly employing a fiber optic displacement sensor according to an embodiment of the present invention.
Figure 23:
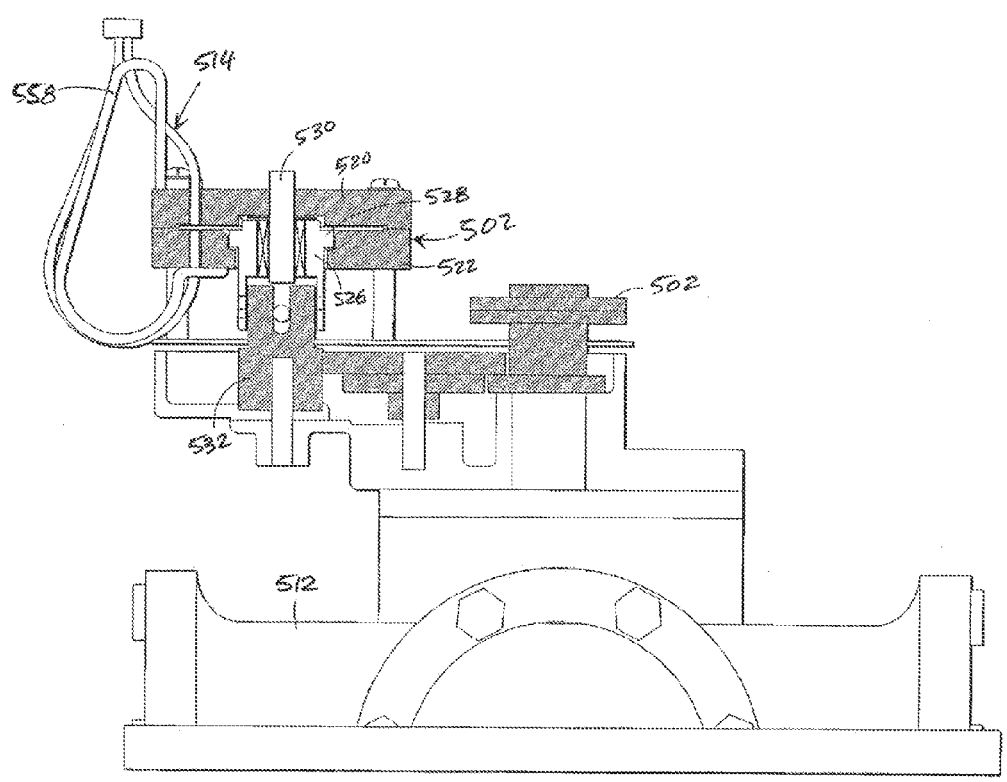
FIG. 23 is an enlarged view of the fuel flow meter assembly of FIG. 22 with the fiber optic displacement sensor shown in partial cross-section.
Figure 24:
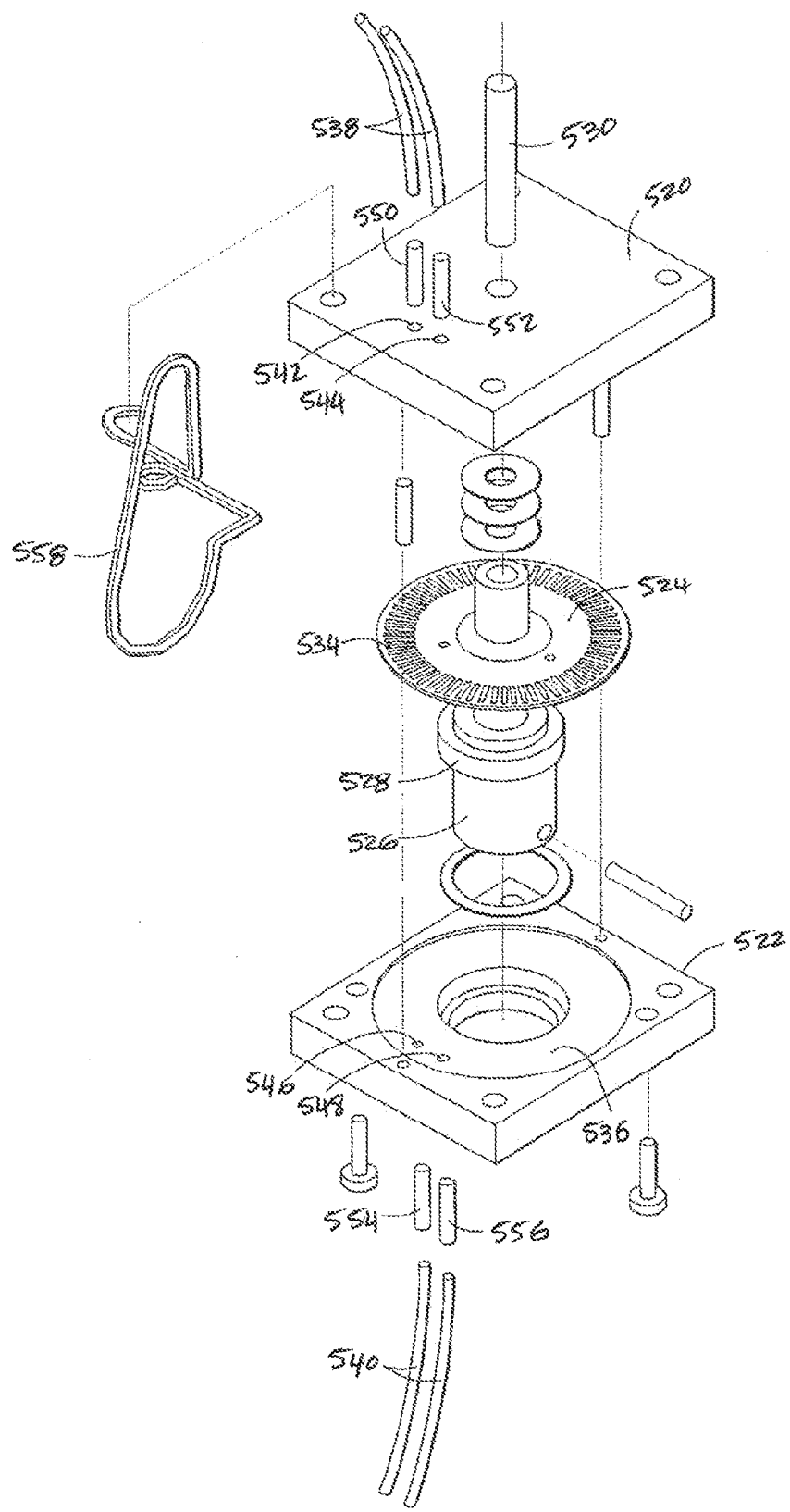
FIG. 24 is an exploded perspective view of the fiber optic displacement sensor of FIG. 23.

In this regard, FIG. 22 is an enlarged cross-sectional view of a fuel dispenser 500 including an exemplary fuel flow meter assembly employing a fiber optic displacement sensor 502 according to an embodiment of the present invention. FIG. 23 is an enlarged view of the fuel flow meter assembly of FIG. 22 with fiber optic displacement sensor 502 shown in partial cross-section. FIG. 24 is an exploded perspective view of fiber optic displacement sensor 502.

Fuel dispenser 500 may preferably be similar in many respects to fuel dispenser 10, described in detail above. Thus, fuel dispenser 500 preferably comprises a vapor barrier 504 which delimits a hydraulic compartment 506 and an electronics compartment 508. In addition, fuel dispenser 500 may preferably comprise a control system 510 analogous to the control systems described above. Further, a flow meter 512, which as illustrated may be a positive displacement flow meter, is operatively connected with fiber optic displacement sensor 502. As noted above, the fuel flow meter assembly of fuel dispenser 500 also preferably comprises an embodiment of a transponder/interrogator electronics encoder, though this encoder is not shown in FIGS. 22-24 to facilitate explanation of fiber optic displacement sensor 502. Further, although not shown in FIG. 22, it will be appreciated that a non-conductive plastic cover analogous to those described above may be provided in certain embodiments.

Fiber optic displacement sensor 502 is configured to provide to control system 510 a signal indicative of the volumetric flow rate of fuel flowing through flow meter 512. In this regard, fiber optic displacement sensor 502 is preferably in optical communication with at least one light source and at least one detector via one or more fiber optic cables 514. In embodiments, the light source(s) may be, for example, light emitting diodes, laser diodes, or the like operating at a predetermined wavelength. The detector(s), which may be any suitable photodetector or photosensor known to those of skill in the art, are operative to detect light at the predetermined wavelength.

The light source(s) and detector(s) are preferably in electronic communication with and controlled by control system 510. As shown in FIG. 22, one or more fiber optic terminals 516 may be coupled with the light source(s) and detector(s) to feed light from the light source(s) onto and feed light to the detector(s) from the optical fibers in fiber optic cables 514. Fiber optic cables 514 may pass through vapor barrier 504 via a conduit seal 518 carried in vapor barrier 504.

As those of skill in the art will appreciate, optical fiber is typically supplied and installed as fiber optic cable. The term "fiber optic cable" refers to the combination of the actual optical fiber plus the structure in which it is carried and protected during and after installation. Generally, a fiber optic cable includes optical fibers, aramid fibers or other strength members, and an outer sheath. Those of skill in the art can select suitable fiber optic cables 514 for use with embodiments of the present invention, but it is noted that a high intensity LED or an inexpensive laser diode provides enough optical power to overcome the losses in even a low-cost optical fiber or simple light pipe.

Referring now to FIGS. 23-24, fiber optic displacement sensor 502 may preferably comprise an upper housing 520 and a lower housing 522 which may be secured together by suitable fasteners, such as bolts or the like. Further, a disc 524 is preferably mounted on a rotor 526. In this regard, rotor 526 may comprise a shoulder 528 on which disc 524 is fixed. Rotor 526 may be carried by and rotate about a stationary shaft 530 carried by upper housing 520. Further, rotor 526 is preferably rotatably coupled to the output shaft of fuel flow meter 512 via a hub 532 and, depending on the configuration of fuel flow meter 512, one or more gears in a gearbox as described above.

Disc 524 preferably comprises a plurality of equally-spaced radial slots 534 defined about the periphery of disc 524. As shown, for example, disc 524 may define 66 such slots 534, though any number of slots may be provided. As fuel flows through fuel flow meter 512, rotor 526 and disc 524 rotate. Disc 524, which may be thin and circular in shape, preferably rotates freely in opposed circular recesses 536 defined in upper housing 520 and lower housing 522 of fiber optic displacement sensor 502.

As shown in FIGS. 23-24, fiber optic displacement sensor 502 may be configured as a quadrature encoder, and fiber optic cables 514 may comprise two cables 538, the optical fibers of which carry light to displacement sensor 502 from corresponding light sources in communication with control system 510, and two cables 540, the optical fibers of which carry light from displacement sensor 502 to corresponding detectors in communication with control system 510. In addition, upper housing 520 preferably defines two adjacent spaced holes 542, 544, and lower housing 522 preferably defines two adjacent spaced holes 546, 548 with substantially identical diameters as holes 542, 544. Holes 542, 544 are preferably respectively axially aligned with holes 546, 548. Holes 542, 544, 546, 548 are defined in housings 520, 522 such that, as disc 524 rotates therebetween, slots 534 pass beneath each hole 542, 544 and above each hole 546, 548. Further, holes 542, 544, 546, 548 may receive fiber optic cable end inserts 550, 552, 554, and 556, respectively, which may be connected with cables 538, 540. A cable support 558 may be provided in some embodiments to maintain cables 538, 540 in an appropriate position.

When a slot 534 is aligned with an opposing pair of holes, 542, 546 or 544, 548, an optical path is created for light to pass from a cable 538 to a cable 540 and be detected at a detector in communication with control system 510. Otherwise, light traveling along the optical fibers of a cable 538 is interrupted by disc 524. Preferably, the spacing of slots 534 and the positions of holes 542, 546 and 544, 548 are such that the respective optical paths are 180° out of phase. In other words, light passing from an optical cable 538, through a slot 534, and to an optical cable 540 via holes 542, 546 is out of phase with light passing from an optical cable 538, through a slot 534, and to an optical cable 540 via holes 544, 548. Accordingly, fiber optic displacement sensor 502 may be able to determine, for example, the relative position, rotational speed, and direction of rotation of disc 524 and, correspondingly, of the output shaft of flow meter 512.

As detected at detectors in communication with control system 510, each out of phase pair of pulses of light passing through slots 534 corresponds to a predetermined volume of fuel measured. The predetermined volume of fuel may be adjusted by calibrating fuel flow meter 512 and fiber optic displacement sensor 502. In one embodiment, 1000 pulses of light passing along a given optical path (e.g., along an optical path defined by holes 542, 546) as disc 524 rotates may correspond to a gallon of fuel measured. In any event, control system 510 is preferably configured to process each detected pulse and cause the volume and price of fuel dispensed to be displayed to a customer.

The number of fiber optic cables in fiber optic cables 514 will depend on the configuration of fiber optic displacement sensor 502 and the configuration of fuel dispenser 500, including the number of fuel flow meters 512 provided therein. In addition, it will be appreciated that, in other embodiments, fiber optic displacement sensor 502 need not be configured as a quadrature encoder. For example, rather than two fiber optic cables leading to and from displacement sensor 502, only one fiber optic cable may lead to and from displacement sensor 502. In this case, although fiber optic displacement sensor 502 may not be able to determine the direction of rotation of disc 524, it still provides a highly accurate determination of the relative position of disc 524 and its rotational speed, and accordingly, the volume of fuel passing through meter 512. Those of skill in the art will also appreciate that, in some embodiments, control system 510 and fiber optic displacement sensor 502 may also be configured such that fiber optic displacement sensor 502 operates as an absolute encoder.

As noted above, fiber optic displacement sensor 502 may be used in conjunction with a displacement sensor using wireless communication between transponders and interrogator electronics to ensure accuracy, detect for flow anomalies, and detect fraud. Because a fiber optic displacement sensor may be more accurate in some cases than the displacement sensor using wireless communication between transponders and interrogator electronics, in one embodiment the light pulses detected at detectors in communication with control system 510 and provided from fiber optic displacement sensor 502 are used as the primary measure of the volumetric flow rate of fuel dispensed. In this embodiment, the transponder/interrogator electronics displacement sensor may preferably supply to control system 510 a profile of the flow rate and volume of fuel dispensed at meter 512. Control system 510 may compare the information in this profile with the information provided by fiber optic displacement sensor 502 to ensure accuracy and prevent fraud. For example, the transponder/interrogator electronics displacement sensor may provide a redundant calculation of fuel flow rate and volume. Even if the information regarding flow rate and volume in this profile may be less accurate in some cases than the information supplied by the fiber optic displacement sensor 502, it would nonetheless provide control system 510 a reliable basis for comparison within predetermined margins of error.

For example, in one embodiment, control system 510 may calculate the volume and flow rate of fuel passing through fuel flow meter 512 based on information from both fiber optic displacement sensor 502 and from a transponder/interrogator electronics displacement sensor. If the volume and/or flow rate as determined via fiber optic displacement sensor 502 differs from the volume and/or flow rate as determined via the transponder/interrogator electronics displacement sensor by more than a predetermined amount (or within a predetermined margin of error, such as 5%), then control system 510 may determine that fraud has occurred. Control system 510 may take appropriate action to address the fraud, such as preventing fueling, alerting a fuel station operator, and/or sounding an alarm, among others.

Further, in an embodiment where information from fiber optic sensor 502 can be used to determine the direction of rotation of the output shaft of flow meter 512, control system 510 may compare this information to the direction of rotation of the output shaft of flow meter 512 as determined via the transponder/interrogator electronics displacement sensor. If the results are not consistent, control system 510 may again determine that fraud has occurred and take appropriate action.

Notably, this combination of displacement sensors may also detect fraud wherein a fraudster has cut one or more of the fiber optic cables 538, 540 leading to and from displacement sensor 502. In particular, as explained above, control system 510 may communicate with a transponder/interrogator electronics displacement sensor to ensure it is operating properly, including when fuel is not being dispensed. If a transponder is not present, for example, an error condition may occur. However, according to another embodiment, even where no information is being received via fiber optic displacement sensor 502, which is an indication that a fueling transaction is not occurring, if control system 510 interrogates the transponder/interrogator electronics displacement sensor and it provides information that fuel is being dispensed, then control system 510 may determine that fraud has occurred and take appropriate action.

In addition, in embodiments where fiber optic displacement sensor 502 is used in conjunction with a transponder/interrogator electronics displacement sensor, any of the methods of fraud detection described above with respect to the transponder/interrogator electronics displacement sensors may be used. For example, control system 510 may communicate with the transponder/interrogator electronics displacement sensor prior to authorizing a fueling transaction to ensure that the transponder and/or interrogator are associated with the correct fuel flow meter or fuel dispenser. As noted above, these communications may be encrypted. Likewise, control system 510 may determine that fraud has occurred based on changes in transponder location or signal levels. This may be the case, for instance, where a transponder/interrogator electronics displacement sensor analogous to the one described above with reference to FIGS. 11-12 is used.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fuel flow meter assembly comprising:
   a fuel flow meter comprising a shaft; and
   a first displacement sensor comprising at least one transponder coupled for rotation with said fuel flow meter shaft and at least one interrogator electronics, said first displacement sensor operative to generate information representative of a first amount of fuel delivered through said fuel flow meter based on remote electronic communication between said at least one interrogator electronics and said at least one transponder;
   a second displacement sensor comprising a disc operatively connected for rotation with said fuel flow meter shaft, said disc defining a plurality of radial slots therethrough, said second displacement sensor in optical communication with a light source and a detector;
   wherein rotation of said fuel flow meter shaft allows light from said light source to pass through said plurality of radial slots and be detected at said detector; and
   wherein said second displacement sensor is operative to generate information representative of a second amount of fuel delivered through said fuel flow meter.

2. The fuel flow meter assembly of claim 1, wherein said light source and said detector are in electronic communication with a fuel dispenser control system.

3. The fuel flow meter assembly of claim 2, wherein said fuel dispenser control system determines said first amount of fuel delivered through said fuel flow meter based on information representative of responsive signals from said transponder to said interrogator electronics and determines said second amount of fuel delivered through said fuel flow meter based on said light detected at said detector.

4. The fuel flow meter assembly of claim 3, wherein said fuel dispenser control system compares said first amount with said second amount.

5. The fuel flow meter assembly of claim 3, wherein said first and second amounts are representative of the flow rate of fuel delivered through said fuel flow meter.

6. The fuel flow meter assembly of claim 5, wherein said at least one interrogator electronics transmits information representative of responsive signals from said transponder to a fuel dispenser control system.

7. The fuel flow meter assembly of claim 1, wherein said at least one transponder comprises a plurality of transponders.

8. The fuel flow meter assembly of claim 7, wherein said fuel dispenser control system is configured to determine at least one of the rate of rotation, direction of rotation, and the position of said fuel flow meter shaft.

9. The fuel flow meter assembly of claim 1, wherein said at least one interrogator electronics is configured to interrogate said at least one transponder during each rotation of said fuel flow meter shaft.

10. A method of detecting fraud in association with a flow meter assembly, said flow meter assembly comprising a flow meter comprising a shaft, said method comprising the steps of:
    providing a first displacement sensor comprising at least one transponder and at least one interrogator electronics;
    generating information representative of a first amount of fluid delivered through said flow meter based on remote electronic communication between said at least one interrogator electronics and said at least one transponder;
    providing a second displacement sensor comprising a disc operatively connected for rotation with said flow meter shaft, said disc defining a plurality of radial slots therethrough, said second displacement sensor in optical communication with a light source and a detector;
    generating information representative of a second amount of fluid delivered through said flow meter based on light detected at said detector; and
    comparing said first amount with said second amount.

* * * * *